United States Patent [19]
Kitamura et al.

[11] Patent Number: 5,762,265
[45] Date of Patent: Jun. 9, 1998

[54] AIR-CONDITIONING CONTROL UNIT

[75] Inventors: Tomoko Kitamura, Moriguchi; Shigeaki Matsubayashi, Sakai; Yasuyuki Shintani, Kobe; Hisashi Kodama, Ikoma, all of Japan

[73] Assignee: Matsushita Electric Industrial Co., Ltd., Osaka, Japan

[21] Appl. No.: 720,958

[22] Filed: Oct. 4, 1996

[30] Foreign Application Priority Data

Oct. 6, 1995 [JP] Japan ............... 7-259758
Jun. 17, 1996 [JP] Japan ............... 8-155550

[51] Int. Cl.$^6$ ............................................. G05D 23/00
[52] U.S. Cl. ................ 236/51; 236/91 E; 236/94; 165/205; 165/208
[58] Field of Search ............ 236/51, 94, 91 R, 236/91 F, 91 E; 165/203, 205, 208, 209; 62/161, 163, 164, 203, 208, 209, 125, 126

[56] References Cited

U.S. PATENT DOCUMENTS

| | | | |
|---|---|---|---|
| 4,482,009 | 11/1984 | Nishimura et al. | 165/203 |
| 5,156,203 | 10/1992 | Funakoshi et al. | 236/51 X |
| 5,170,935 | 12/1992 | Federspiel et al. | 236/94 X |
| 5,544,697 | 8/1996 | Clark | 165/209 |

FOREIGN PATENT DOCUMENTS

| | | |
|---|---|---|
| 5-248683 | 9/1993 | Japan. |
| 05322258 | 12/1993 | Japan. |
| 6-94290 | 4/1994 | Japan. |
| 06213493 | 8/1994 | Japan. |
| 06331198 | 11/1994 | Japan. |

OTHER PUBLICATIONS

"ISO Draft Proposal DP7730," 11 Jan. 1982, 23 pp.
Danmarks Tekniske Hojskole, "Thermal Comfort", McGraw–Hill Book Company, (1972), pp. 109–134.

Primary Examiner—Harry B. Tanner
Attorney, Agent, or Firm—Ratner & Prestia

[57] ABSTRACT

Complaint rate calculation means for calculating complaint rates in consideration of thermal feeling entered from vote value input means, a data storage unit for storing complaint rates together with indoor thermal conditions, updating means for calculating a function representing the relationship between thermal conditions and complaint rates in accordance with stored data, and predicted thermal condition calculation means for calculating thermal setting values by substituting entered control information into the function representing the relationship between thermal conditions and complaint rates, can convert a complaint vote of each inhabitant to a characteristic thermal feeling of a group so as to directly reflect the feeling on air-conditioning control.

8 Claims, 21 Drawing Sheets

Fig. 3(a)

| no. | Warmth-caused complaint rate | Cold-caused complaint rate | Environment evaluation value |
|-----|------------------------------|----------------------------|------------------------------|
| 1   |                              |                            |                              |
| 2   |                              |                            |                              |
| 3   |                              |                            |                              |
| 4   |                              |                            |                              |
| 5   |                              |                            |                              |
| ⋮   | ⋮                            | ⋮                          | ⋮                            |

Fig. 3(b)

| no. | Warmth-caused complaint rate | Cold-caused complaint rate | Environment evaluation value | Room temperature | Radiation temperature | Humidity | Airflow velocity | Amount of clothing | Amount of activity |
|-----|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| ⋮ | ⋮ | ⋮ | ⋮ | ⋮ | ⋮ | ⋮ | ⋮ | ⋮ | ⋮ |

Comfortable

| Voter's ID number (mail address) |
|---|
| Date/time of voting |
| Vote value |

Fig. 16

| Voter's ID number (mail address) |
|---|
| Date/time of voting |
| Vote value |
| Temperature sensor information |
| Flag indicating cold-caused complaint |
| Flag indicating warmth-caused complaint |

Warmth-caused complaint: curve rising from left to right
Cold-caused complaint: curve lowering from left to right

AIR-CONDITIONING CONTROL UNIT

BACKGROUND OF THE INVENTION

1. Field of the Invention

The present invention relates to an air conditioner for cooling and heating the air in office buildings and ordinary houses, and more particularly to an air-conditioning control unit provided with a function of calculating an optimal room temperature setting value in accordance with the thermal feeling votes of inhabitants.

2. Related Art of the Invention

An air conditioner has been proposed, which performs control to make inhabitants comfortable on the basis of PMV (Predicted Mean Vote), an index indicating a general thermal condition. As specified in ISO 7730, PMV is calculated from a PMV equation, namely an equation in thermal equilibrium between human body and environment, in consideration of environment factors, such as air temperature, radiation temperature, humidity and airflow velocity, and human factors, such as clothing and activity conditions. The PMV output is a predicted mean thermal feeling developed among inhabitants, but does not indicate any difference among individual inhabitants. In order to meet the preferences of individual inhabitants, an apparatus has been proposed, which renews and modifies the PMV equation in accordance with the vote of each inhabitant.

For example, an apparatus for controlling air-conditioning devices in response to the change in the thermal feelings of inhabitants has been invented as disclosed in Japanese Laid-open Patent Application No. Hei 6-94292. This conventional thermal-feeling-responsive air conditioner is explained below with reference to the drawings.

FIG. 9 is a view showing the basic configuration of the thermal-feeling-responsive air conditioner. The air conditioner mainly comprises thermal-feeling-vote-responsive air-conditioning control means 2, an air conditioner unit 6, a controller 5, a neural network unit 8, a sensor 3, and a man-machine interface 4-1.

Next, the operation of the above-mentioned conventional air conditioner is generally described below. In a central control room 1, air conditioning setting values are input and operation conditions are monitored. The air conditioner unit 6 can adjust the amount of conditioned air in proportion to the air-conditioning load in an air-conditioned space 7 under the control of the controller 5. On the basis of votes from the man-machine interface 4-1 for detecting thermal votes of inhabitants, the thermal-feeling-vote-responsive air-conditioning control means 2 makes calculations by using a PMV equation corresponding to the votes of the inhabitants. The controller 5 controls the air conditioner unit 6 on the basis of PMV calculated from the PMV equation. The PMV equation teaching signal generation unit 83 of the thermal-feeling-vote-responsive air-conditioning control means 2 considers the combinations of air temperature, airflow velocity, humidity, radiation temperature, the amount of clothing and the amount of activity in the range of the standard air-conditioning conditions on the basis of the conventional PMV equation.

The signal generation unit 83 then calculates a PMV value and delivers the obtained result as a teaching signal. The learning unit 81 of the thermal-feeling-vote-responsive air-conditioning control means 2 learns the standard PMV equation by using the teaching signal. After the learning, in case there is no vote from the inhabitants, the controller 5 performs control by using the PMV value calculated by using the standard PMV equation on the basis of the air temperature, airflow velocity, humidity and radiation temperature detected by the sensor 3. On the other hand, in case an inhabitant is not satisfied with the air-conditioning, a vote value is input from the man-machine interface 4-1 to an inhabitant-responsive teaching signal generation unit 82, and the air temperature, airflow velocity, humidity and radiation temperature are input from the sensor 3 to the inhabitant-responsive teaching signal generation unit 82. The learning unit 81 performs relearning on the basis of these combinations and modifies the PMV equation by reflecting the thermal feeling of an individual inhabitant. After the relearning, the controller 5 controls the air conditioner unit 6 on the basis of the PMV value calculated from the modified equation.

Furthermore, Japanese Laid-open Patent Application No. Hei 5-322258 discloses an air conditioner which operates in consideration of individual difference in thermal feeling by directly changing the coefficients of the PMV equation in accordance with the vote. This air conditioner predicts that the difference in individual feeling is caused by two factors: "1": sensitive to the heat or cold, and "2": sensitive to temperature change or not. The difference in individual feeling is considered by changing a skin penetration coefficient (a) used to calculate the amount of unsensible evaporation in the case of the factor "1". In the case of the factor "2", the difference is considered by changing the coefficient (m) between PMV and the thermal load of human body. However, it is impossible to predict which factor ("1" or "2") is how much related to the difference between PMV and an actual vote value. Therefore, the two factors are gradually changed within certain ranges so as to obtain a new PMV equation suited to individual feeling.

FIG. 10 is a view showing the basic configuration of this thermal-feeling-vote-responsive air conditioner. In the following drawings, common components are represented by the same number, and the explanation of them is partially omitted. Referring to FIG. 10, in addition to various sensors 3, an air-conditioning space 7 is provided with vote value input means 4 used for an inhabitant to exercise a vote on the indoor environment by stating that it is hot, cold or comfortable. The vote entered to the vote value input means 4 is input to modification means 12. Among the PMV calculation coefficients, the values of the coefficients (a and m) to be modified are stored in a coefficient storage unit 121 of the modification means 12. A PMV calculation means 13 reads the coefficients of the PMV equation stored in the coefficient storage unit 121, the information from the various indoor sensors 3 and the values of various input means so as to calculate a PMV value. The modification mode determination means 129 of the modification means 12 determines a modification method on the basis of the vote value and the PMV value. The coefficient modification means 122 of the modification means 12 modifies the values of the coefficients (a and m) on the basis of the vote value and the PMV value calculated by an indoor thermal index calculation means 15 in accordance with the modification method determined as described above. In case there is no difference between the vote value and the setting value of the air-conditioned space 7, which is calculated by the PMV calculation means 13, a switch 14 is not closed, and no modification is performed. Information for controlling the switch 14 is transmitted from the modification mode determination means 129. The modification mode determination means 123 compares the PMV value calculated by the PMV calculation means 13 with the PMV value calculated from the vote value so as to find any difference, and controls the switch 14 depending on the result of the comparison. The modified coefficients are stored in the coefficient storage unit 121, and delivered to the PMV calculation means 13 and the setting value calculation means 16. At the setting value calculation means 16, a setting temperature value is calculated by assigning the information on thermal conditions detected by the sensors 3 and the amount of clothing and the amount of activity entered from an initial setting input means 10 to the modified PMV equation. By using the result of the calculation, cooling temperature setting means 17 performs cooling temperature setting.

In FIGS. 9 and 10, a switch 9 is a circuit for selecting one representative inhabitant who exercises a thermal feeling vote. In case there are a plurality of inhabitants, the thermal feelings of the inhabitants must be averaged or treated appropriately so as to obtain a representative value, and the representative value must be input.

However, the conventional thermal-feeling-responsive air conditioner has the problem of causing inapplicability to air conditioning for a group of people, because the thermal feeling vote is exercised by each person. More specifically, in order to convert the votes of the individual persons to the vote of the group, the votes of the individual persons must be converted into numeral values and then must be averaged comprehensively, for example. To accomplish this, it is necessary to assure an equidistant characteristic in a scale categorized in a plurality of steps, such as seven steps, cold: "–3", cool: "–2", slightly cool: "–1", neutral: "0", slightly warm: "1", warm: "2" and hot: "3". However, in case such a scale based on human language expressions is used, no equidistant characteristic can be assured in the scale, because the feelings toward the language expressions differ from person to person. As a result, no calculation can be performed. Consequently, the votes of the individual persons cannot be converted to the vote of the group, whereby the air conditioner cannot be applied to air conditioning for a group of inhabitants (this problem is hereinafter referred to as problem A).

On the other hand, in consideration of the problem of being unable to meet the preferences of individual persons in the above-mentioned conventional PMV system, a method of performing air-conditioning control by obtaining PMV values from sensors provided for individual persons has been invented so as to grasp the thermal feelings of individual persons. Japanese Laid-open Patent Application No. Hei 5-248683 relates to an air conditioner, wherein information from a thermal feeling sensor provided for each computer is delivered via a network to an air-conditioning control unit, and air conditioning is performed on the basis of the thermal feeling information obtained near the computer so as to attain air conditioning for each person by using a computer assigned to each person. This conventional air conditioner is described below with reference to the drawings.

FIG. 18 is a block diagram showing the basic configuration of the operation control unit of this air conditioner, and FIG. 19 is a view showing the configuration of the hardware of the air conditioner. As shown in FIG. 18, the operation control unit mainly comprises thermal feeling sensor units 171 provided for a plurality of computers 101 connected to a network so as to detect and deliver the thermal feelings near the installation areas of the computers 101, thermal feeling information processing means 211 for obtaining and processing thermal feeling information, air-conditioning control means 212 for controlling an air conditioner unit 104 so as to obtain predetermined air-conditioning conditions around the installation position of each computer 101, installation position storage means 172 for storing the installation position of each computer 101 in advance, and the air conditioner unit 104. In the case of control in accordance with the preferences of individual persons, it is necessary to provide an individual thermal feeling preference database 173 for storing information on individual persons, and individual identification means 175 for identifying individual persons.

Next, the operation of the above-mentioned conventional apparatus is described in general. When the computer 101 connected to the network is turned on, electric power is supplied to the thermal feeling sensor unit 171, and the thermal feeling sensor unit 171 detects the environment conditions, such as temperature, around the installation position of the computer 101. The detected thermal feeling information is delivered to thermal feeling information receiving means 207 via the network. To the air-conditioning control means 212, the thermal feeling information receiving means 207 delivers the installation position information taken out of the installation position storage means 172 for storing the installation position of each computer 101 in advance. Furthermore, the thermal feeling information receiving means 207 delivers thermal feeling information to the thermal feeling information processing means 211. The thermal feeling information processing means 211 derives the air-conditioning conditions around the installation position of each computer 101 by calculation, and also derives the amount of control, such as the amount of air blown toward the computer, so that the air-conditioning conditions around the computer 101 can maintain the setting values entered from control information input means 116, thereby controlling the air conditioner unit 104. In the case of air-conditioning control in accordance with the preference of an inhabitant, the individual identification means 175 identifies the individual located around the computer 101 when thermal feeling information is entered. The air-conditioning conditions are corrected by correction control means 176 so that the air-conditioning conditions are set to those obtained in consideration of the individual inhabitant's information from the individual thermal feeling preference database 173, the data of which has been entered from individual information input means 174 in advance. The air conditioner unit 104 then performs air conditioning in accordance with the air-conditioning conditions. In case information stating that inhabitant A prefers temperature 1° C. higher than a predetermined temperature (or the person prefers slightly higher temperature or is sensitive to the cold, for example) is input for example, the operation of the air conditioner unit 104 is controlled so that the temperature 1° C. higher than the temperature of the air-conditioning condition calculated by the air-conditioning control unit is obtained around the installation position of the computer used by the inhabitant A.

However, in order to perform air-conditioning control for each person by using the operation control unit of this kind of conventional air conditioner, it is necessary to obtain thermal feeling information, such as PMV, for each person. More precisely, it necessary to obtain environment sensing information, such as temperature, humidity and air velocity. However, it is very difficult to grasp accurate circumstances unless sensors are installed in each computer; the installation of sensors requires higher costs. In addition, since the air conditioner uses the correction control means which performs correction on the basis of personal information on the conditions at each position entered in advance, namely the conditions at the installation position of each computer, it is difficult to accurately identify a person in case the person is moved or replaced with another person frequently. Furthermore, a lot of time is necessary to enter personal information in the above-mentioned case. Moreover, in case a remote control unit generally used as means for actually deriving complaints of individuals in conventional household air conditioners is used in a space, such as an office room accommodating a plurality of persons, the number of the remote control units is apt to be limited because of the high costs of the remote control units. Consequently, the number of users is limited, and air-conditioning control is apt to be changed in accordance with the subjective views of a person who controls the remote control unit. Consequently, it is difficult to reflect the actual preferences of all the persons in the room, and the control and maintenance of the remote control units require additional manpower and storage space. (These problems are hereinafter referred to as problem B.)

SUMMARY OF THE INVENTION

In order to solve the problem A encountered in the above-mentioned conventional air-conditioning control unit, the present invention provides an air-conditioning control unit capable of reflecting the characteristic of a group of people by renewing a PPD curve, which represents a function of a thermal condition and predicted complaint rate, in accordance with complaint votes of inhabitants so as to obtain the thermal feeling of the group using a probability model.

To solve the problem A, the air-conditioning control unit of the present invention operates as described below. Inhabitants enter complaints about thermal feeling (hot or cold) by using vote-value input means, a man-machine interface. On the basis of the complaint votes obtained from the vote value input means, complaint calculation means calculates a complaint rate (a rate of inhabitants having complaints about the thermal feeling) having two different variables: one variable for the rate of inhabitants having complaints about the heat and the other variable for the rate of inhabitants having complaints about the cold. Indoor thermal condition calculation means calculates thermal conditions obtained by converting the information on thermal conditions from various sensors provided in an air-conditioned space to thermal environment evaluation indexes, such as PMV and ET*. A data storage unit stores the actual complaint rate obtained from the complaint rate calculation means and the air-conditioned space's thermal conditions obtained from the indoor thermal condition calculation means. When new data is input to the data storage unit, data including the new data is read and input to updating means. The updating means approximates the function of the complaint rate and the thermal conditions to a Warm-PPD curve and a Cold-PPD curve. Predicted thermal condition calculation means calculates environment setting values by substituting the setting complaint rate, namely the complaint rate to be controlled, into the latest PPD curve (representing a function of complaint rate and thermal condition) calculated by the updating means. A controller controls the air conditioner unit by using the environment setting value calculated by the predicted thermal condition calculation means as a control temperature value in the air-conditioned space.

In addition, the present invention is intended to solve the problem B encountered in the above-mentioned conventional air-conditioning control unit. The object of the present invention is to provide an air conditioner for performing optimal air-conditioning control using existing sensors without prior input of personal information by taking the subjective votes of all the persons having office automation terminals directly and simply and by statistically processing the votes.

In order to solve the problem B, the air-conditioning control unit of the present invention comprises computer terminals having input means used by inhabitants to exercise their votes on requests for their air-conditioning environment conditions, communication means for transmitting signals entered from the computer terminals via the input means over communication lines, such as a network, request estimation means for estimating requests for the air-conditioning environment conditions of all the inhabitants on the basis of the signals transmitted by the communication means, index calculation means for calculating the index indicating the relationship between the request calculated by the request estimation means and the thermal conditions in the air-conditioning environment, control amount calculation means for calculating the amount of control in the air-conditioning environment on the basis of the index calculated by the index calculation means, and air-conditioning control means for controlling the air conditioner in accordance with the amount of control calculated by the control amount calculation means.

BRIEF DESCRIPTION OF THE DRAWINGS

FIG. 1 is a view showing the configuration of an air-conditioning control unit in accordance with an embodiment of the present invention;

FIG. 2 is a view showing the configuration of an air-conditioning control unit in accordance with another embodiment of the present invention;

[FIG. 3]

FIG. 3(a) is a table showing an example of data structure in the data storage unit of the air-conditioning control unit in accordance with the present invention;

FIG. 3(b) is a table showing another example of data structure in the data storage unit of the air-conditioning control unit in accordance with the present invention;

FIG. 4 is a flowchart showing the flow of control for calculating a setting ET* from a setting complaint rate in an embodiment of the air-conditioning control unit in accordance with the present invention;

FIGS. 5(a),(b) is a flowchart showing the flow of control for calculating a setting ET* from a setting complaint rate in an embodiment of the air-conditioning control unit in accordance with the present invention;

FIGS. 6(a),(b) is a flowchart showing the flow of control in updating means in an embodiment of the air-conditioning control unit in accordance with the present invention;

FIG. 7 is a graph showing the control characteristics of updating means in an embodiment of the air-conditioning control unit in accordance with the present invention;

FIG. 8 is a graph showing the range of the setting thermal condition ET* in an embodiment of the air-conditioning control unit in accordance with the present invention;

FIG. 9 is a view showing a basic configuration of a thermal-feeling-responsive air conditioner in accordance with a conventional embodiment;

FIG. 10 is a view showing a basic configuration of a thermal-feeling-responsive air conditioner in accordance with another conventional embodiment;

FIG. 11 is a block diagram of the control means of the air-conditioning control unit of an embodiment of the present invention;

FIG. 12 is a hardware configuration diagram of the control means of the air-conditioning control unit of an embodiment of the present invention;

FIG. 13 is a view of a window for voting in an embodiment of the air-conditioning control unit in accordance with the present invention;

FIG. 14 is a table showing a data structure of vote information transmitted via communication means in the air-conditioning control unit of an embodiment of the present invention;

FIGS. 15(a),(b) is a flowchart showing the flow of signals in the request estimation means in an embodiment of the air-conditioning contour unit in accordance with the present invention;

[FIG. 16]

FIG. 16 is a view showing a data structure of thermal conditions and vote values stored in the data storage means of the air-conditioning control unit of an embodiment of the present invention;

FIG. 17 is a view showing a data structure of thermal conditions and vote values stored in the data storage means of the air-conditioning control unit of an embodiment of the present invention;

(FIG. 17 is a graph showing the index of default complaint rates.)

FIG. 18 is a block diagram showing the basic configuration of the control unit of a conventional embodiment; and

FIG. 19 is a view showing the hardware configuration of conventional embodiment.

[Explanation of Reference Codes]

Figure 1:
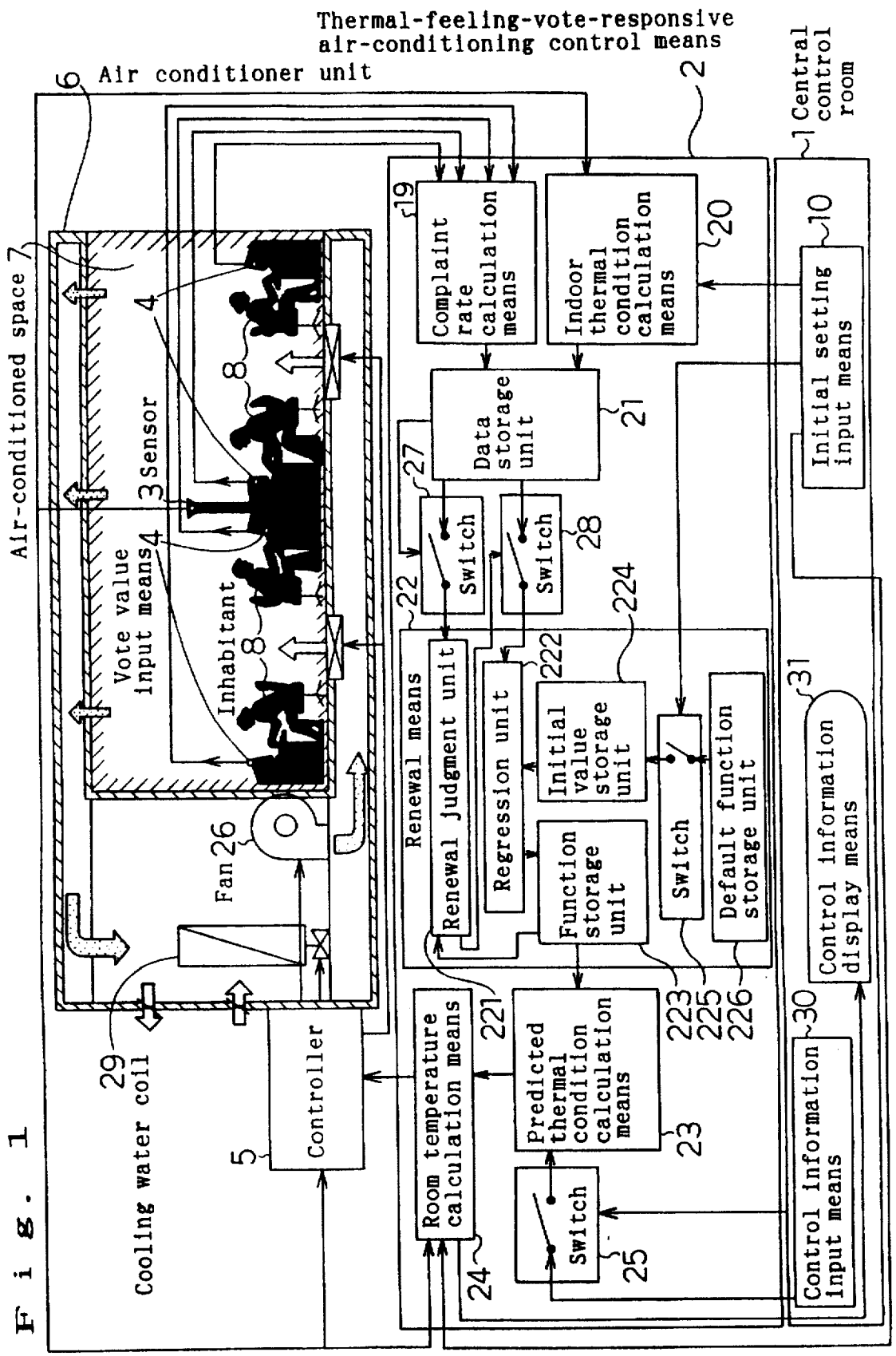
[FIG. 1]

1 Central control room
2 Thermal-feeling-vote-responsive air-conditioning control means
4 Vote value input means
5 Controller
6 Air conditioner unit
7 Air-conditioned space
19 Complaint rate calculation means
20 Indoor thermal condition calculation means
21 Data storage unit
22 Renewal means
23 Predicted thermal condition calculation means
24 Room temperature calculation means
30 Control information input means
31 Control information display means
32 Operation mode judgment means
33 Environment setting value calculation means
101 Computer terminal
102 Communication means
104 Air conditioner unit
108 Request estimation means
110 Thermal condition detection means
111 Index calculation means
112 Control amount calculation means
113 Air-conditioning control means
114 Reception confirmation means
171 Sensor

PREFERRED EMBODIMENTS

Technology on which the present invention is based is first described below before the explanation of embodiments in accordance with the present invention.

"PPD" was stated in a book entitled "Thermal Comfort" written by P. O. Fanger. The term is not detailed here. ISO 7730 specifies as follows: "The PPD index is used to establish a method of quantitatively predict the number of persons complaining about thermal conditions. PPD indicates the rate (percentage) of the number of persons feeling thermal discomfort. In other words, in a seven-step thermal feeling scale from hot (+3), warm (+2), slightly warm (+1), neutral (0), slightly cool (−1), cool (−2) and cold −3), persons are requested to answer by selecting one of the steps of hot (+3), warm (+2), cool (−2) and cold (−3). Once a PMV value is determined, PPD can be obtained according to FIG. 27 on page 131 of the above-mentioned book, or obtained from the following equation.

$$PPD = 100 - 95 \cdot e^{-(0.03353 \cdot PMV^4 + 0.2179 \cdot PMV^2)}$$ [Expression 1]

The PPD index indicates the number of persons complaining about thermal conditions, among a plurality of persons. The rest of the persons feel that the thermal condition is neutral, slightly cool or slightly warm." On the assumption that votes about a single thermal condition have normal distribution, the votes corresponding to steps of hot (+3) and warm (+2) are judged to indicate that the voters complain about the heat, and the votes corresponding to steps of cold (−3) and cool (−2) are judged to indicate that the voters complain about the cold. The probits of these are read by statistic operation, and their total is obtained as the PPD index value. In the present invention, the PPD index is regarded to have two categories: one (Warm-PPD) based on warmth-caused complaints and the other (Cold-PPD) based on cold-caused complaints in accordance with the calculation by Fanger.

The environment evaluation value in the present invention indicates a thermal environment evaluation index, such as PMV or ETA*, for evaluating the relationship between thermal environment conditions and thermal feelings in consideration of the heat balance of the human body. A control method using ET* is described below in the explanation of the present embodiment. ET* is not detailed here since it was explained in ASHRAE Transactions 76 (1971) and stated in many literatures available widely. In short, ET* is used to theoretically predict physiological state values and feelings as bodily feeling temperature on the basis of the amount of thermal stimulus obtained from physical environment factors. ET* includes six main thermal factors: air temperature, radiation temperature, airflow, humidity, the amount of clothing and the amount of metabolism.

Next, a complaint index is explained. The complaint index of the present invention is a function representing the relationship between complaint rate (or complainer rate) (PPD value) and thermal condition, such as ET*. In other words, the complaint index is a function for predicting the rate of persons complaining about thermal feeling. The index is a value calculated by reading the probits representing warmth-caused complaints and the probits representing cold-caused complaints. To renew the index, namely the function, depending on the preferences or the like of inhabitants, approximation is necessary by using a simply renewable equation. Since the probit is a means for representing probability integration, the probit is laterally symmetrical with respect to the point of inflection of a logistic curve having a saturation level (100%). This characteristic is identical to that of a logistic regression equation. Accordingly, a PPD curve is assigned to a logistic regression equation so as to ease updating. The function is stored by the memorization of the coefficients $\alpha w$, $\beta w$, $\alpha c$ and $\beta c$ of the logistic regression lines represented by the following equations.

[Expression 2]

$$\text{Warm-}PPD = \frac{100}{1 + e^{\alpha w + \beta w \cdot x}}$$

$$\text{Warm-}PPD = \frac{100}{1 + e^{\alpha c + \beta c \cdot x}}$$

where X is an index indicating a thermal condition, such as ET*.

By using the logistic regression function as a complaint index, the characteristics of inhabitants, such as preferences and constitutions can be easily reflected to the complaint index. That is to say, the index can be easily renewed by receiving complaints of inhabitants.

An embodiment of the present invention is explained below with reference to the drawings.

FIG. 1 is a view showing the configuration of an underfloor air-conditioning control unit for a building in accordance with an embodiment of a first invention. Referring to FIG. 1, numeral 30 represents control information input means for inputting a complaint rate, namely a rate of persons complaining about the thermal conditions in an air-conditioned space 7. Numeral 31 represents control information display means for displaying control information or the like predicted for the complaint rate having been set in each air-conditioned space 7 to be controlled on the basis of the information. Numeral 10 represents initial setting input means for inputting data reset information or the like at the time of the change in initial values at the turn of the season or at the time of the significant change in the number of persons in the air-conditioned space 7 or the like, and for inputting thermal factors, such as the amount of clothing and the amount of activity, which cannot be detected by sensors. Numeral 19 represents complaint rate calculation means for calculating the rate of warmth-caused complaints, namely the proportion of persons complaining about the warmth to the total inhabitants and the rate of cold-caused complaints, namely the proportion of persons complaining about the cold to the total inhabitants in comprehensive consideration of a plurality of complaint votes about room temperature, namely wishes requesting lower or higher temperature, obtained from the vote value input means 4.

Numeral 20 represents indoor thermal condition calculation means for calculating the thermal conditions in the air-conditioned space 7 on the basis of the thermal condition values, such as room temperature, relative humidity and airflow velocity obtained by the sensor 3, and the thermal factors, such as the amount of clothing and the amount of activity, entered from the initial setting input means 10.

Numeral 21 represents a data storage unit for storing the complaint rates entered from the complaint rate calculation means 19, and for storing PMV and other thermal factors entered from the indoor thermal condition calculation means 20. Numeral 22 represents updating means for calculating a PPD curve, namely obtaining a complainer index, most appropriately indicating a storage data group, namely the complaint rates and the thermal conditions of the air-conditioned space 7, when such a data group is entered from the data memory unit 21. Numeral 221 represents an updating judgment unit constituting the updating means 22, for judging whether it is necessary to renew the complainer index or not by statistically judging whether the latest complaint rate (about the thermal condition at that time) calculated on the basis of newly entered votes is a function on the PPD curve indicating as the immediately preceding complainer index. Numeral 222 represents a regression unit for performing logistic regression by reading the past storage data group from the data storage unit 221 when the updating judgment unit 221 judged that it was necessary to renew the complainer index. Numeral 223 represents a function storage unit for storing the latest logistic function calculated by the regression unit 222 by the memorization of the above-mentioned coefficients $\alpha w$, $\beta w$, $\alpha c$ and $\beta c$. Numeral 224 represents an initial value storage unit for calculating a plurality of initial values from default functions. Numeral 226 represents a default function storage unit for storing approximate functions based on the data of the environment evaluation values and the predicted complaint rate (PPD) generally disclosed in ISO 7730 or the like in the form of coefficients. Numeral 23 represents predicted thermal condition calculation means for calculating setting thermal conditions by substituting the setting complaint rate entered from the control information input means 30 into the complainer index read from the function storage unit 223. Numeral 24 represents room temperature calculation means for calculating the setting room temperature by substituting the setting PMV obtained by the predicted thermal condition calculation means and the thermal factors detected by the sensor or entered in the air-conditioned space 7 into the ET* calculation equation. The calculated setting room temperature value is delivered to the controller 5 so as to control the opening/closing amount of the valve of a cooling water coil 29 and the revolution speed of a fan 26, whereby air-conditioning control is performed to keep the room temperature in the air-conditioned space 7 at the setting value.

The operation of the air-conditioning control unit having the above-mentioned configuration is described below. When the control unit is operated for the first time or operated after the operation mode is changed at the turn of the season, a signal is delivered from the initial setting input means 10. The delivered signal enters a switch 225. The switch 25 turns on, and the coefficients $\alpha w$ and $\beta w$ of the regression line for the warmth-caused complaint (Warm-PPD) used as a complaint rate index, the coefficients $\alpha c$ and $\beta c$ of the regression line for the cold-caused complaint (Cold-PPD) as another complaint rate index and the lowest complaint rate $\gamma$ stored in the default function storage unit 226 are delivered to the initial value storage unit 224. The lowest complaint rate $\gamma$ is a value which cannot be made smaller no matter how the setting of the air-conditioned space 7 is changed. The lowest complaint rate is generally obtained in a terminal condition wherein the regression line for the warmth-caused complaint intersects the regression line for the cold-caused complaint. Generally reliable complainer indexes have been stored in the default function storage unit 226. That is to say, the relationship between operation temperature and PPD for an office building is shown in B. W. Olesen: Thermal Comfort, B & K Technical Report, 1982. Accordingly, the value obtained by converting the relationship to ET* should be subjected to logistic regression, and the logistic function obtained as the result of the regression should be stored.

The initial setting input means 10 is used to input the information listed in TABLE 1 and is a hierarchical man-machine interface. Default values have been determined for the respective items of the information. The amount of clothing and the amount of activate are input at the start of operation. However, the signals for these information items can be changed in the middle of operation. After the signals are input, the latest information is delivered to the indoor thermal condition calculation means 20 and the room temperature calculation means 24, and used to calculate the thermal condition ET*.

TABLE 1

| Initial operation | | |
|---|---|---|
| Cooling-only operation | Start | |
| | Stop | |
| Cooling/heating operation | Start | |
| | Stop | |
| Data | Storage (media) | |
| | Reset | Initial function default Designation |
| Amount of clothing | Default | |
| | Input | Summer clothing Winter clothing Spring/autumn clothing CLO value input |
| Amount of activity | Default | |
| | Input | Sales work Machine operation (standing actively) Experiment work, etc. (standing quietly) Office work (sitting on chair) Relaxation met value input |
| | Sensor information | |

As shown in TABLE 1, the amount of clothing can be selected from among summer clothing, winter clothing, spring/autumn clothing and manual input. A data value of 0.6 clo is delivered in the case of summer clothing, 1.0 clo in the case of winter clothing, and 0.75 clo in the case of spring/autumn clothing. When nothing is input by the manager in charge of air-conditioning control, 0.60 clo is delivered in the cooling-only operation mode, and 1.0 clo in the cooling/heating operation mode as default values. In the same way, the amount of activity can be selected from among sales work, machine operation (standing actively), experiment work, etc. (standing quietly), office work (sitting on chair), relaxation and manual input. A data value of 2.8 met is delivered in the case of sales work, 2.0 met in the case of machine operation (standing actively), 1.6 met in the case of experiment work, etc. (standing quietly), 1.2 met in the case of office work (sitting on chair), and 1.0 met in the case of relaxation. Once the amount of activity is input at the time of initial operation, this setting is stored for each air conditioner unit. Operation is thus possible without further input of the data. In case nothing is input, 1.2 met is delivered as a default value.

When operation is started, and when a setting complaint rate is input from the control information input means 30, the switch 25 is closed, and a signal from the control information input means 30 is delivered to the predicted thermal condition calculation means 23. When the delivery terminates, the switch 25 opens to stop the delivery of the signal. The predicted thermal condition calculation means 23 confirms that the setting complaint rate PDd is not lower than the lowest complaint rate γ.

$$\gamma \leq PDd \qquad \text{[Expression 3]}$$

In case this is not satisfied, the value of the lowest complaint rate is substituted into the setting complaint rate.

$$PDd = \gamma \qquad \text{[Expression 4]}$$

When the setting complaint rate PDd is input from the control information input means 30, the predicted thermal condition calculation means 23 reads the latest complainer index stored in the function storage unit 223, and PDd is substituted into the complainer index having been read so as to calculate ET*, a setting thermal condition of control conditions. The result of the calculation is delivered to the room temperature calculation means 24. In other words, since PDd is the sum of the warmth-caused complaint rate PDwd and the cold-caused complaint rate PDcd, it is necessary to solve the following equation (Expression 5).

[Expression 5]

$$PDd = PDwd + PDcd$$

$$PDwd = \frac{100}{1 + e^{\alpha w + \beta w \cdot x(n)}}$$

where x(n) is ET* (setting thermal condition) of the latest input data.

Figure 4:
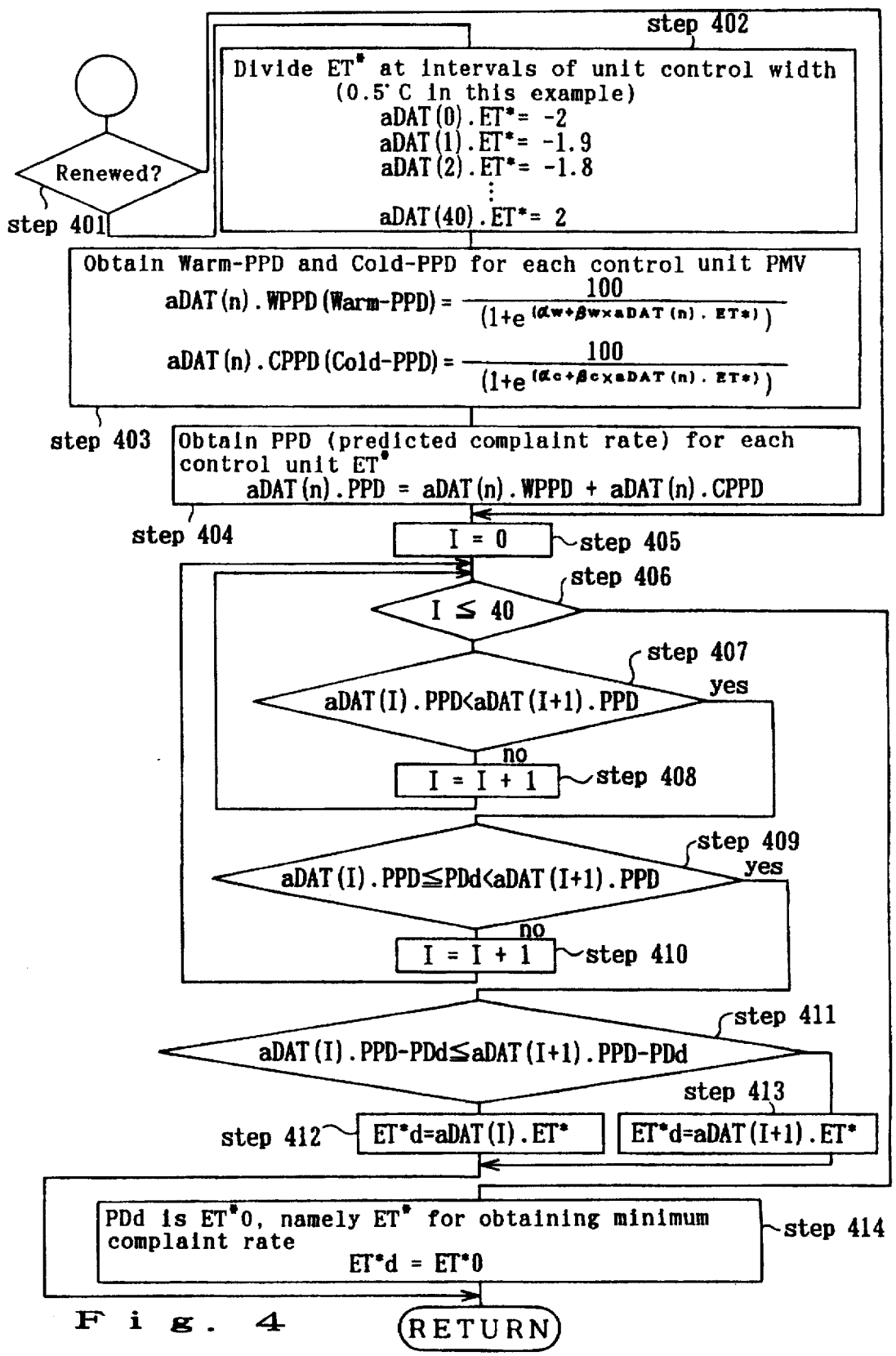
[FIG. 4]

FIG. 4 shows a method of calculating the setting thermal condition from the setting complaint rate, the function of the predicted thermal condition calculation means 23. In step 401, judgment is performed whether the latest complainer index of the function storage unit 20 having been input to the predicted thermal condition calculation means 23 is the same as the complainer index entered immediately before. In case they are the same, the control proceeds to step 405. In case they differ from each other, the control proceeds to step 402. In step 402, ET* is divided at intervals of 0.5° C., a unit control width. The unit control width is determined depending on the performance of the air conditioner unit 6 and the conditions in the air-conditioned space 7. In FIG. 4, ET* is divided into 40 equal divisions in the range of 15° to 35° C. The reason for selecting the range of 15° to 35° C. is as follows: in the ranges other than the range of 15° to 35° C., the complaint rate generally reaches close to 100%, and it will become not worthwhile using air conditioning. Furthermore in step 403, the following equations are used to obtain warmth-caused complaint rate aPDwd (i) and cold-caused complaint rate aPDcd (i) for every equal division of ET* obtained in step 402.

[Expression 6]

$$aPDwd(i) = \frac{100}{1 + e^{\alpha w + \beta w \cdot ax(i)}}$$

$$aPDcd(i) = \frac{100}{1 + e^{\alpha c + \beta c \cdot ax(i)}}$$

where ax(i) is ET* at every unit control width.

In step 404, the sum of the two rates, namely complaint rate aPDd(i) is obtained.

$$aPDd(i)=aPDwd(i)+aPDcd(i) \quad \text{[Expression 7]}$$

To find out a value of aPDd(I) closest to PDd, search is repeated in step 405 until a counter counts from I=0 to I=40. In case a value of aPDd(I) closest to PDd is not found out, it is assumed that PDd has been set at the minimum complaint rate or lower. Therefore, in step 414, ET*d is replaced with ET*0, a thermal condition for obtaining the minimum complaint rate. In step 407, the counter counts until ax(I) becomes not less than a complaint rate for obtaining the lowest complaint rate. In step 409, to find out aPDd(I) closest to PDd, search is performed for PDd values in the range of aPDd(I) to aPDd(I+1).

$$aPDd(i) \leq PDd < aPDd(i+1) \quad \text{[Expression 8]}$$

In step 411, either aPDd(I) or aPDd(I+1), whichever is closer to PDd, is selected. In case aPDd(I) is closer to PDd, K=I is set in step 412. In case aPDd(I+1) is closer to PDd, k=I+1 is set in step 413. Setting ET* becomes ax(k) used to obtain aPDd(k).

On the other hand, the sensors 3 disposed in the air-conditioned space 7 detect the thermal conditions in the air-conditioned space 7, and the thermal conditions are input to the room temperature calculation means 24. By the room temperature calculation means 24, the detected humidity, airflow velocity and radiation temperature, and the amount of clothing and the amount of activity entered from the initial setting input means 10 are assigned to the PMV equation so as to calculate the setting room temperature. The ET* calculation equation is not described here, since it has generally disclosed according to ASHRAE or the like. The setting room temperature calculated by the room temperature calculation means 24 is delivered to the controller 5. Cooling or air circulation operation is thus performed so as to adjust the temperature in the air-conditioned space 7 to the setting room temperature.

The vote value input means 4 is disposed in the air-conditioned space 7 to allow each person to enter complaints about thermal conditions as desired. In comprehensive consideration of these complaints, calculation is performed to obtain PDw which is the rate of persons complaining about the warmth and PDc which is the rate of persons complaining about the cold among all the inhabitants in the air-conditioned space 7. In the indoor thermal condition calculation means 20, the air temperature, humidity, airflow velocity and radiation temperature detected by the sensors 3 disposed in the air-conditioned space 7, and the amount of clothing and the amount of activity entered from the initial setting input means 10 are assigned to the ET* calculation equation so as to calculate a thermal condition x(n), namely ET*. PDw, PDc and x(n) are simultaneously input from the complaint rate calculation means 19 and the indoor thermal condition calculation means 20 to the data storage unit 21 and stored in the data storage unit 21. The stored data is not erased unless a data reset signal is input from the initial setting input means 10. FIG. 3(a) shows the data structure of the data storage unit 21. However, in case all environment conditions in addition to the thermal condition ET* have been stored as shown in FIG. 3(b), the data can also be used when indexes other than ET* are used. When PDw, PDc and x(n) are input to the data storage unit 21, the switch 27 is closed, and the input data is delivered to the updating judgment unit 221. The updating judgment unit 221 judges whether the input data deviates from the PPD curve indicating the latest complainer index stored in the function storage unit 223. In case the input data does not deviate, the complaint index stored in the function storage unit 223 is not required to be renewed. The thermal-feeling-vote-responsive air-conditioning control means 2 then enters waiting mode until new input is sent from the central control room, and the air conditioner unit 6 is continuously operated under the control of the controller 5. On the other hand, in case the updating judgment unit 221 judges that the input data deviates and it is necessary to renew the PPD curve, the switch 28 is closed so as to deliver the group of all storage data from the data storage unit 21 to the regression unit 222. The regression unit 222 calculates the regression equation most suitably representing the group of the past storage data. A logistic function is used depending on the property of the PPD curve. In addition to the past storage data, three to five pieces of default data stored in the initial value storage unit 10 are also used for regression so as to prevent improper regression in case the group of the storage data is biased or the size of the group is small. The pieces of default data stored in the initial value storage unit 10 are complainer indexes entered from the default function storage unit 223. Since the indexes include ET* wherein almost 100% inhabitants will complain about the warmth and ET* wherein almost 100% inhabitants will complain about the cold, improper regression can be minimized even if there is any bias in an actual complaint rate and thermal condition data. Furthermore, a 95% reliability zone is calculated. Deviation values between predicted values and measured values are judged in decreasing order whether they are in the 95% reliability zone. In case a deviation value is not in the zone, the value is eliminated and the regression is performed again. Detecting and eliminating values existing outside the zone prevents input errors, and also prevents complaint rates obtained in special cases, such as a complaint rate obtained after recreation at a whole workplace, from being reflected to a complainer index. The complaint index newly calculated by the regression unit 19 is stored in the function storage unit 223 in the form of coefficients and used to calculate setting thermal conditions or the like.

Figure 6A:
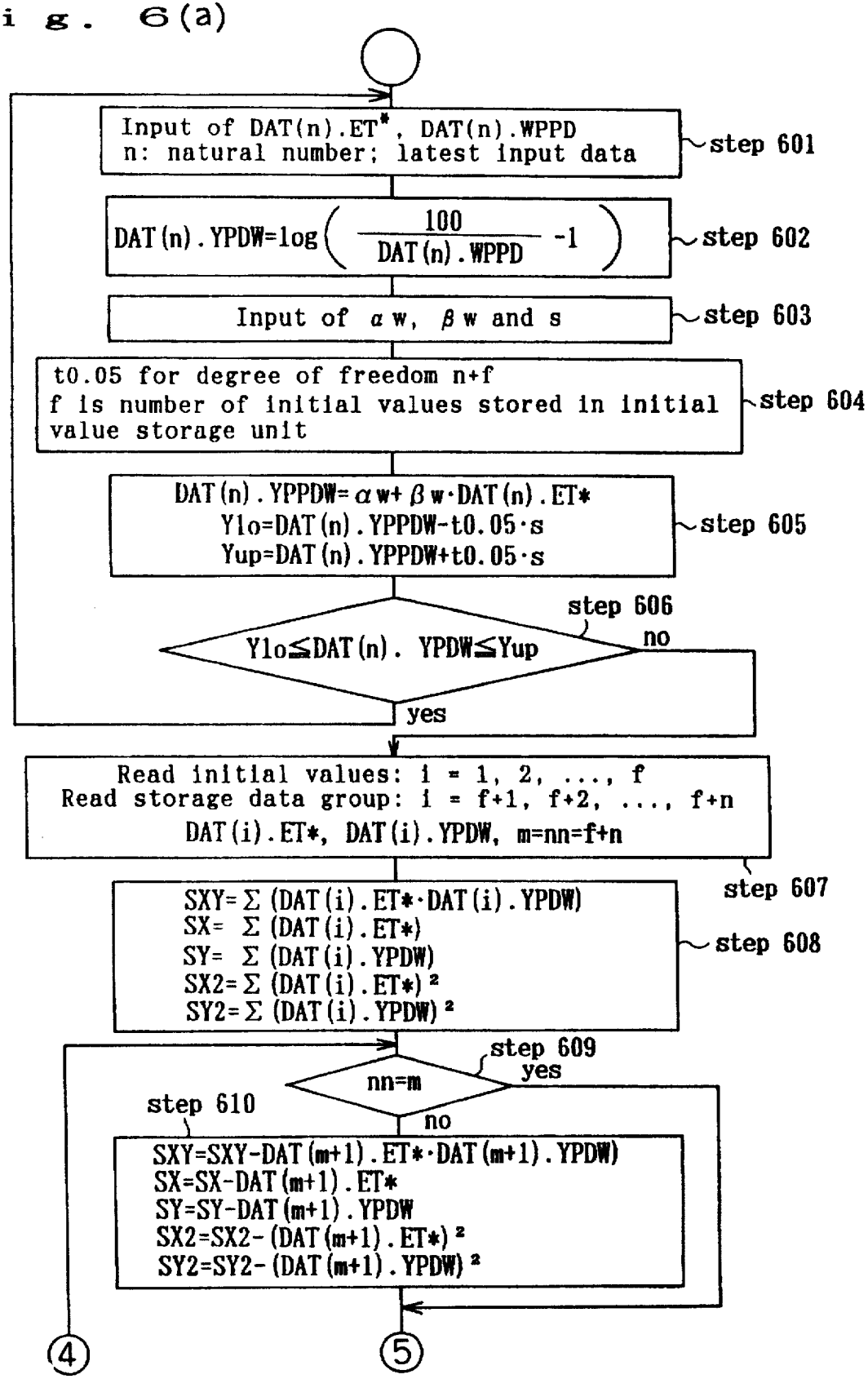
[FIGS. 6(a),(b)]
Figure 6B:
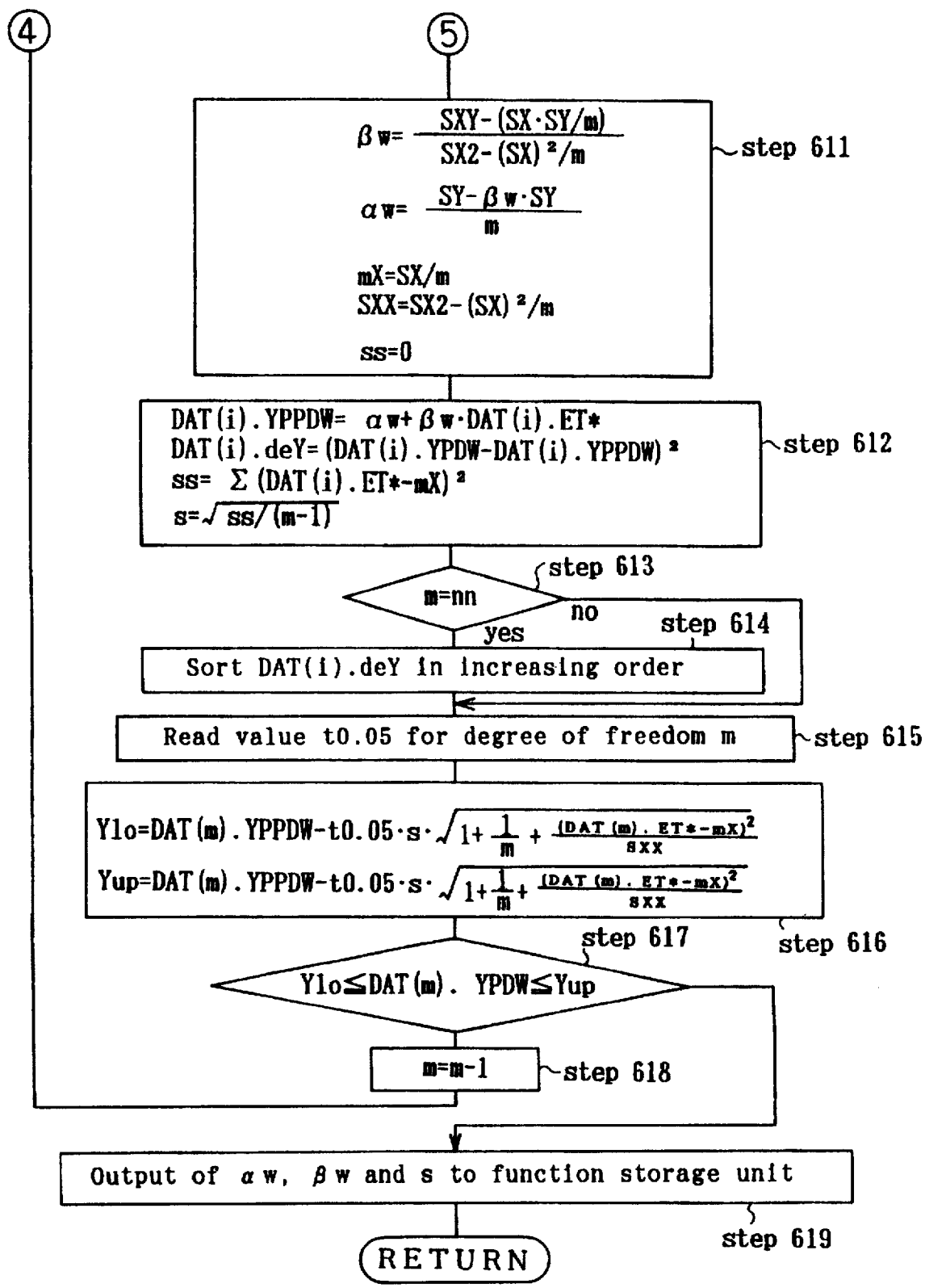

The operation of the data updating means 22 described above is explained below with reference to FIGS. 6(a),(b). A heat-caused complaint rate is calculated in the following explanation. However, a similar calculation is also performed when a cold-caused complaint rate is renewed. In step 601, new data PDw and x(n) are input to the data storage unit 21. Furthermore, since logistic regression can be treated in the same way as linear regression by logarithmic conversion, PDw is converted to a logarithmic value in step 602 in accordance with the equation described below.

[Expression 9]

$$YPDw(n) = \log\left(\frac{100}{PDw(n)-1}\right)$$

In step 603, αw, βw and s stored in the function storage unit 223 are read. In step 604, value t0.05 is read as a degree of freedom from the t-distribution table of the total data quantity (the sum of the number of initial values and the number of data stored in the data storage unit 21). In step 605, the 95% reliability zone of the regression line of the complainer index is calculated in accordance with the following equation.

[Expression 10]

$$YPPDw(n) = \alpha w + \beta w \cdot ET^*(n)$$

$$Ylo = YPPDw(n) - t0.05$$

$$Yup = YPPDw(n) + t0.05$$

In step 606, the complainer index is judged whether it is in the 95% reliability zone of the regression line. In case the complaint index is in the zone, the control returns to step 601 so as to wait for new data input, since it is not necessary to renew the regression line. In case the complaint index is not in the zone, the initial values stored in the initial value storage unit 224 and all data stored in the data storage unit 21 are read in step 607. The number of the initial values is set at f, and the number of the data stored in the data storage unit 21 is set at n. In step 608, calculation is performed to obtain the sum SXY of the product of the logarithmically-converted warmth-caused complaint rate YPDw and ET* values, the sum SX of ET* values, the sum SY of YPDw values, the sum SX2 of squares of ET* values, and the sum SY2 of squares of YPDw values.

[Expression 11]

$$SXY = \Sigma ET^*(i) \cdot YPDw(i)$$

$$SX = \Sigma ET^*(i)$$

$$SY = \Sigma YPDw(i)$$

$$SX2 = \Sigma ET^*(i)^2$$

$$SY2 = \Sigma YPDw(i)^2$$

In step 609, judgment is performed to determine whether the current loop is the first loop or not. In case the current loop is the first loop, the coefficients of the regression line is calculated by using the statistic values obtained in step 608. The following equation is obtained when (Expression 9) is substituted into (Expression 6).

$$YPDw(n) = \alpha w + \beta w \cdot x(n) \qquad \text{[Expression 12]}$$

It is possible to use the following formulas for calculating the coefficients of the linear regression in accordance with the method of least squares.

[Expression 13]

$$\beta w = \frac{SXY - \frac{SX \cdot SY}{m}}{\frac{SX2 - SX^2}{m}}$$

$$\alpha w = \frac{SY - \beta w \cdot SY}{m}$$

Furthermore, the average mX and the sum of deviation square SXX of ET* (I) are obtained so that they can be used to detect runout values. The predicted value YPPDw of the logarithmically-converted warmth-caused complaint rate for each ET* is obtained in step 612.

$$YPPDw(i) = \alpha w + \beta w \cdot x(i) \qquad \text{[Expression 14]}$$

where x(i) is the ith ET*.

The difference deY between the predicted value and the actual logarithmically-converted warmth-caused complaint rate YPDw is then obtained.

$$deY(i) = (YPDw(i) - YPPDw(i))^2 \qquad \text{[Expression 15]}$$

where x(i) is the ith ET*.

In step 612, the sum ss of the squares of deviation values and the standard deviation s of ET* are obtained so that they can be used to detect runout values. In step 614, the deviation deY between the predicted values YPPDw obtained in step 612 and the actual complaint rate YPDw are sorted in increasing order. In step 615, value t0.05 is read from the t-distribution table for the degree of freedom m. In step 616, the 95% reliability zone of the regression line of the complainer index is calculated for the largest data of the deviation deY as described below.

[Expression 16]

$$Ylo = YPPDw(m) - t0.05 \cdot s \cdot \sqrt{1 + \frac{1}{n} + \frac{(x(m) - mX)^2}{SXX}}$$

$$Yup = YPPDw(m) + t0.05 \cdot s \cdot \sqrt{1 + \frac{1}{n} + \frac{(x(m) - mX)^2}{SXX}}$$

where YPPDw(m) is a warmth-caused complainer rate predicted from the complainer index.

x(m) is ET*.

mX is the average of all data.

In step 617, judgment is performed to determine whether the data having the maximum deviation from the predicted value is in the reliability zone.

$$Ylo \leq YPDw(m) \leq Yup \qquad \text{[Expression 17]}$$

In case the deviation is in the reliability zone, $\alpha w$, $\beta w$ and s are delivered to the function storage unit 223 in step 619, and the control exits from the loop. In case the deviation is not in the reliability zone, the deviation is regarded as a runout value and discarded. In step 618, the number of data is subtracted by one as shown in the following equation.

$$m = m - 1 \qquad \text{[Expression 18]}$$

The control returns to step 609. This return is necessary since more than one runout value may be present in the data because the data storage unit 21 stores all the data obtained by the votes of the inhabitants. Since the number of data is subtracted by one in step 618, m does not coincide with the sum nn of the number f of the initial values and the number n of all the data. Therefore, the control proceeds to step 610. In step 610, the statistic values of SXY, SX, SY, SX2 and SY2 are calculated after excluding the data having the maximum deviation discarded in step 617.

Figure 7:
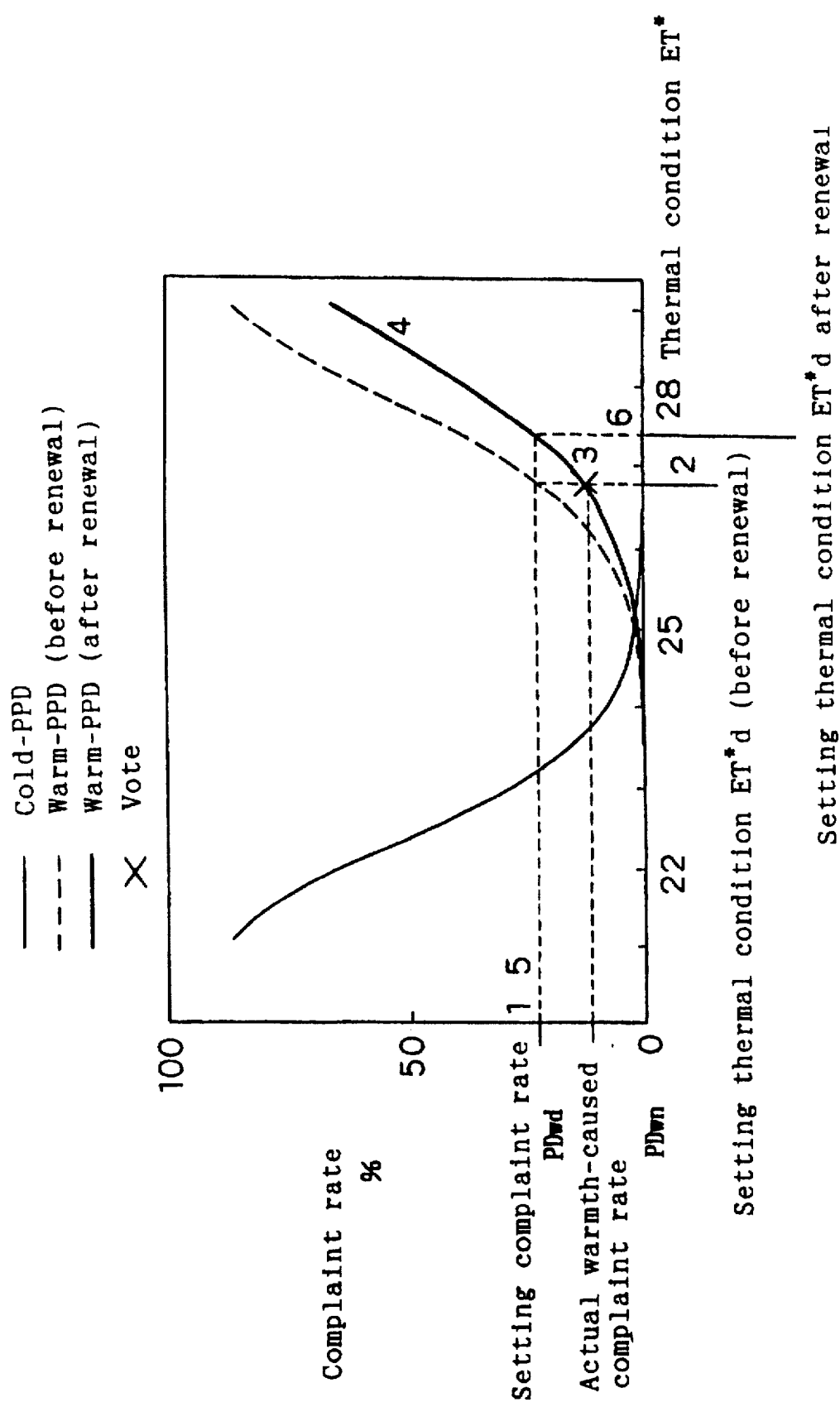
[FIG. 7]
Figure 8:
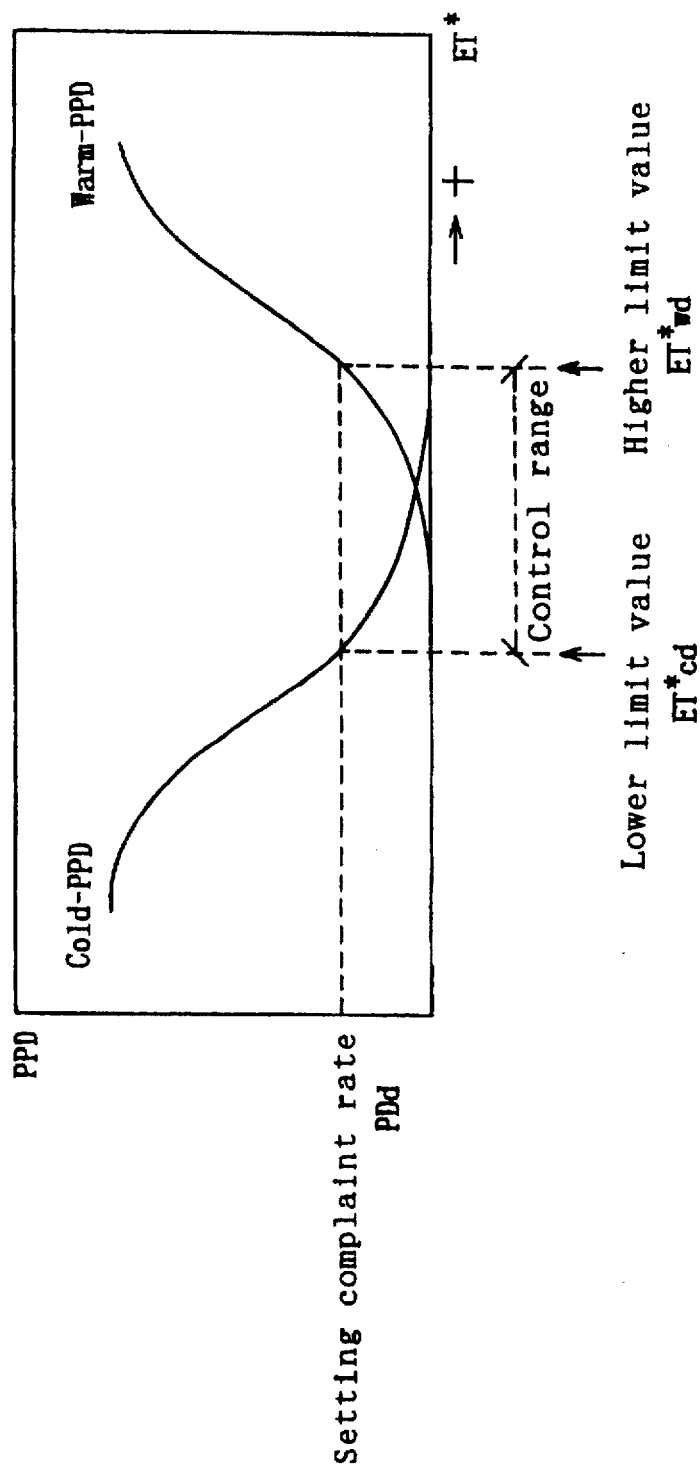
[FIG. 8]
Figure 9:
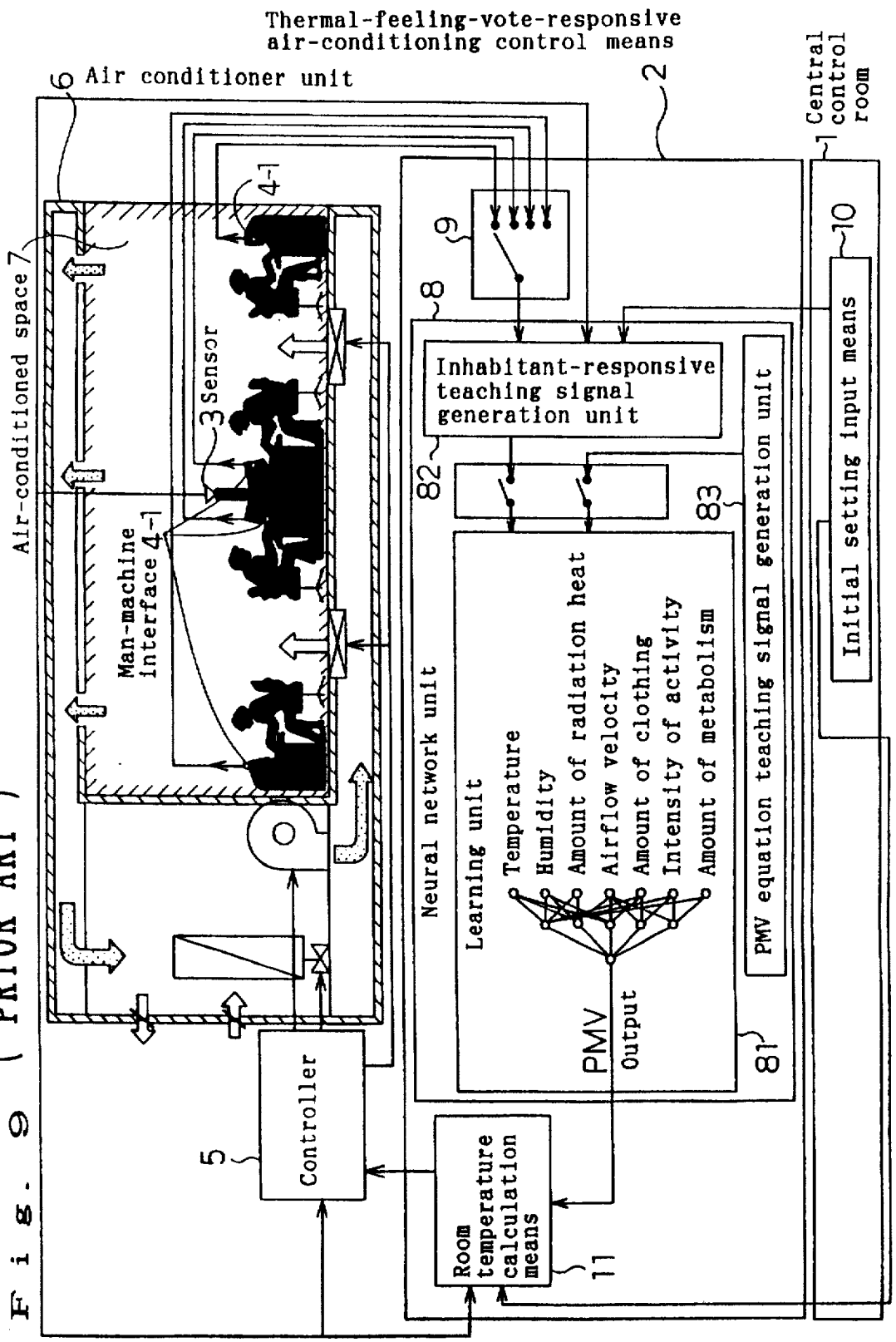
[FIG. 9]
Figure 10:
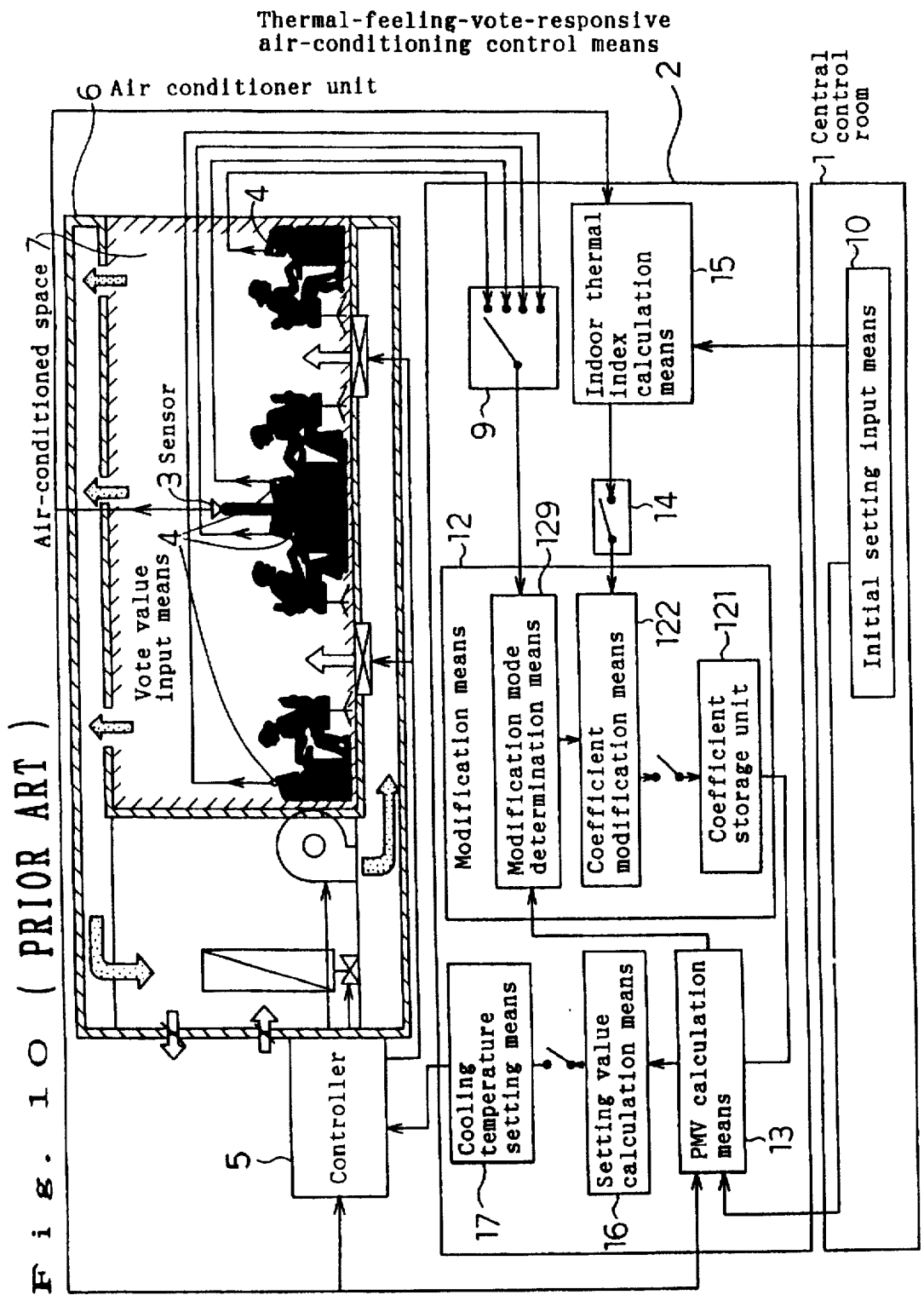
[FIG. 10]

By repeating the operation hereafter, the regression coefficients of the complainer index are calculated and runout values are detected. FIG. 7 shows the operation of the simplest updating means. More precisely, when the warmth-caused complaint rate PDwd is input, the thermal condition setting value ET* is calculated on the basis of Warm-PPD used before updating, and the space is controlled in accordance with ET*d. In case the inhabitant vote PDwn with respect to ET*d is not in the reliability zone of the Warm-PPD regression line used before updating, the operation shown in FIGS. 6(a),(b) is repeated, thereby performing regression so that the complaint index becomes an equation indicating PDwn with respect to ET*d. As a result, the Warm-PPD regression line of the complaint index can most appropriately represent the relationship between the thermal conditions of the air-conditioned space and the complaint rate.

By repeating the above-mentioned operation, air conditioning is performed in accordance with the preferences and constitutions of the group staying in the air-conditioned space 7.

Figure 2:
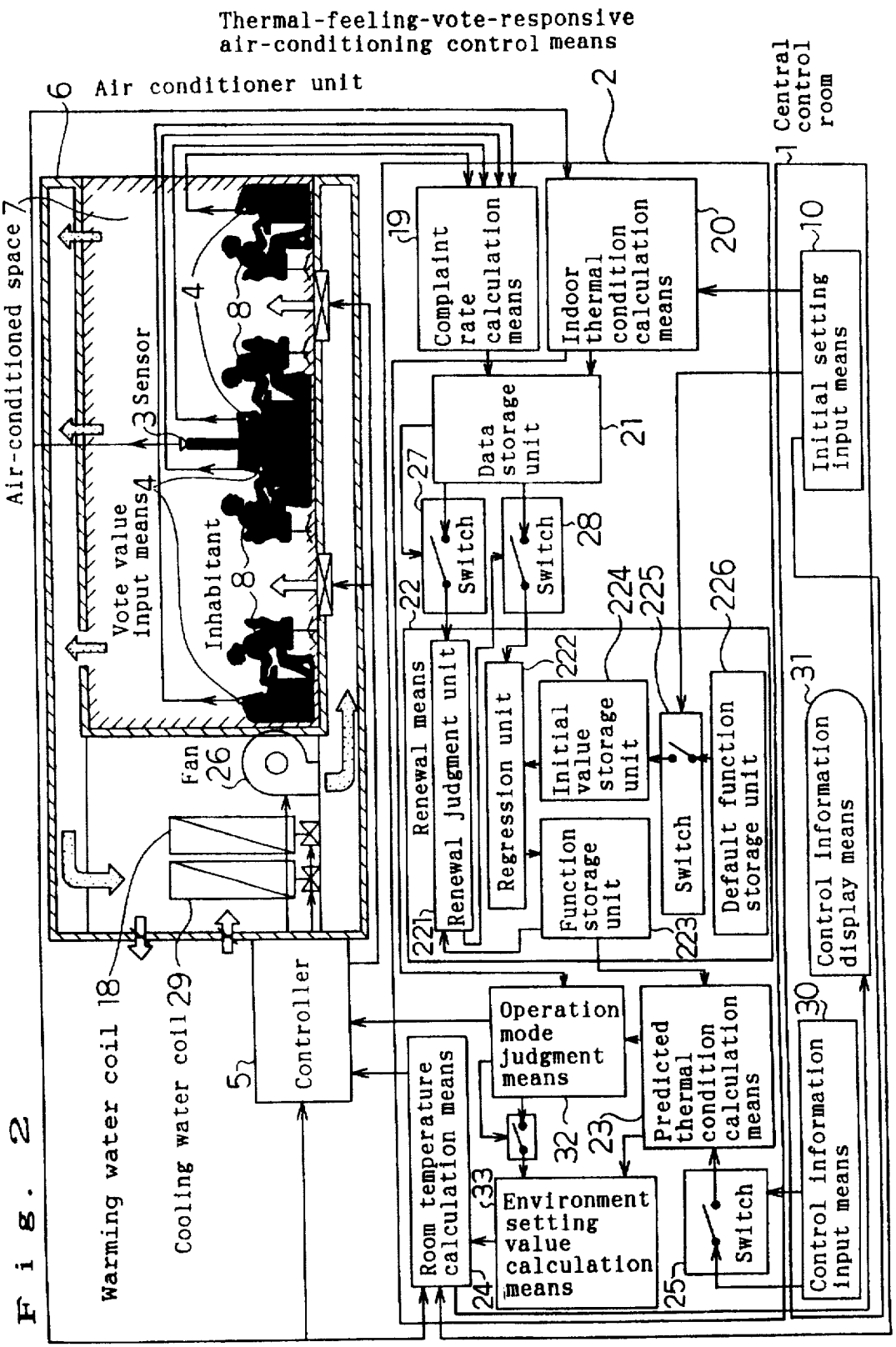
[FIG. 2]

FIG. 2 is a view showing the configuration of a under-floor air-conditioning control unit for a building. This air-conditioning control unit is implemented by using the air-conditioning control unit in accordance with another embodiment of the present invention and is capable of performing cooling/heating operation. The components common to those of the embodiment of the present invention shown in the configuration drawing of FIG. 1 are represented by the same numbers. In FIG. 2, numeral 23 represents predicted thermal condition calculation means When setting complaint rate PDd is input from a control information input means 30, the complaint rate is substituted into the complainer index stored in a function storage unit 233 so as to calculate the setting PMV range to be controlled within the setting complaint rate. Numeral 32 represents operation mode judgment means. The operation mode judgment means 32 selects cooling, heating or air circulation mode by comparing the thermal conditions of the air-conditioned space 7 calculated by an indoor thermal condition calculation means 20 with the setting thermal condition range calculated by a predicted thermal range calculation means 23. Numeral 33 represents environment setting value calculation means. The environment setting value calculation means 33 calculates setting thermal condition ET*d when the cooling or heating operation mode is selected by the operation mode judgment means 32.

In case the air-conditioning control unit having the above-mentioned additional components is used to perform cooling/heating operation, the operations by the additional components are explained below. When the setting complaint rate PDd is input from the control information input means 30, the predicted thermal range calculation means 23 checks whether the input value is not lower than the lowest complaint rate γ. In case the input value is lower, the lowest complaint rate is substituted into the setting complaint rate. In case the input value is not lower, the predicted thermal range calculation means 23 reads the latest complainer index stored in the function storage unit 223. PDd is substituted into the complainer index having been read so as to calculate ET*wd, the highest value of the setting thermal condition ET*d to be controlled, and ET*cd, the lowest value of the setting thermal condition ET*d to be controlled. These calculated values are delivered to the operation mode judgment means 32 and the environment setting value calculation means 33. However, since PDd is the sum of the warmth-caused complaint rate PDwd and the cold-caused complaint rate PDcd, it is necessary to solve the following equation (Expression 19).

[Expression 19]

$$PDd = PDwd + PDcd$$

$$PDwd = \frac{100}{1 + e^{aw+\beta w \cdot x}}$$

$$PDcd = \frac{100}{1 + e^{ac+\beta c \cdot x}}$$

where x is ET*d (setting thermal condition).

Figure 5A:
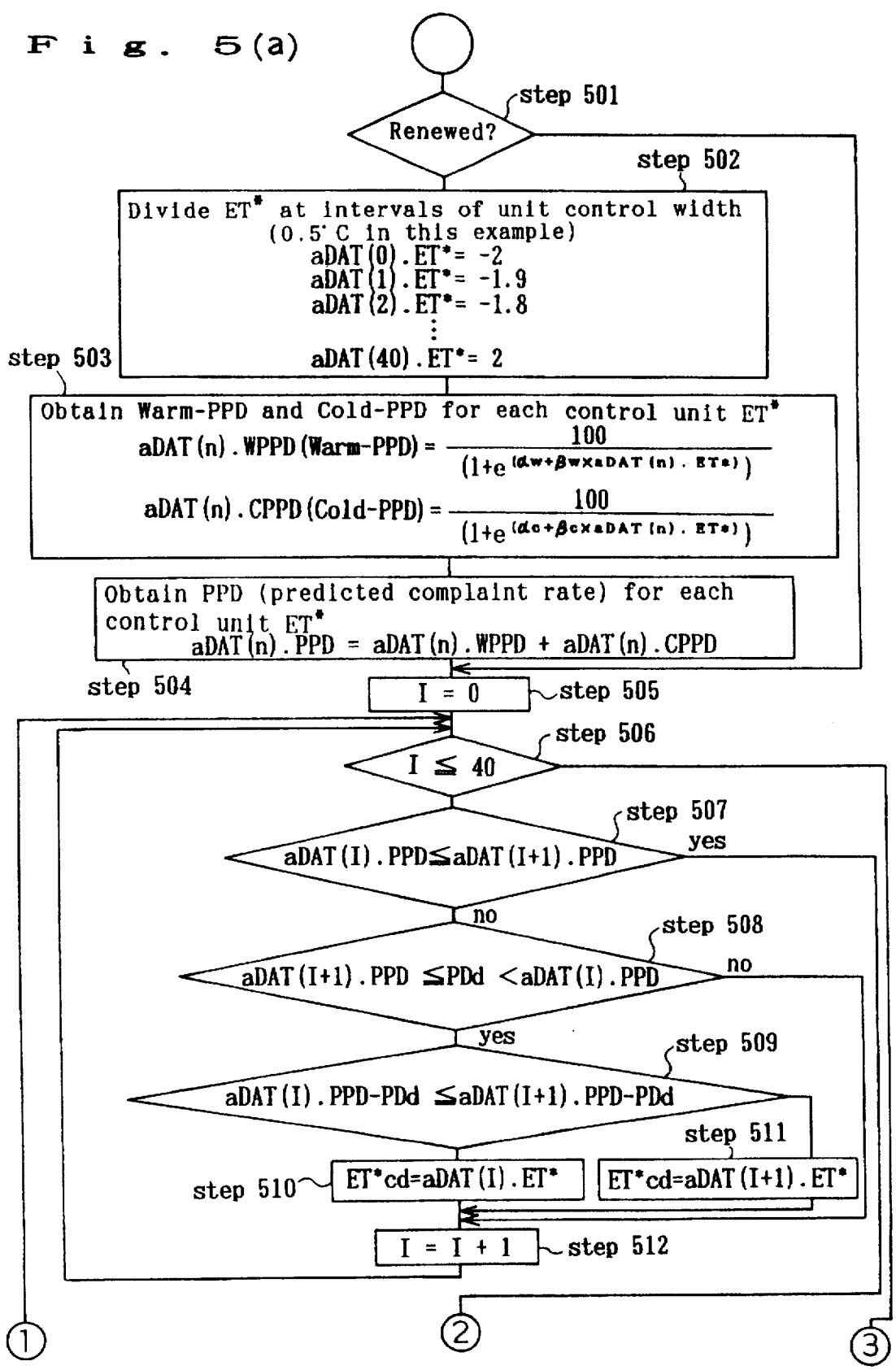
[FIGS. 5(a),(b)]
Figure 5B:
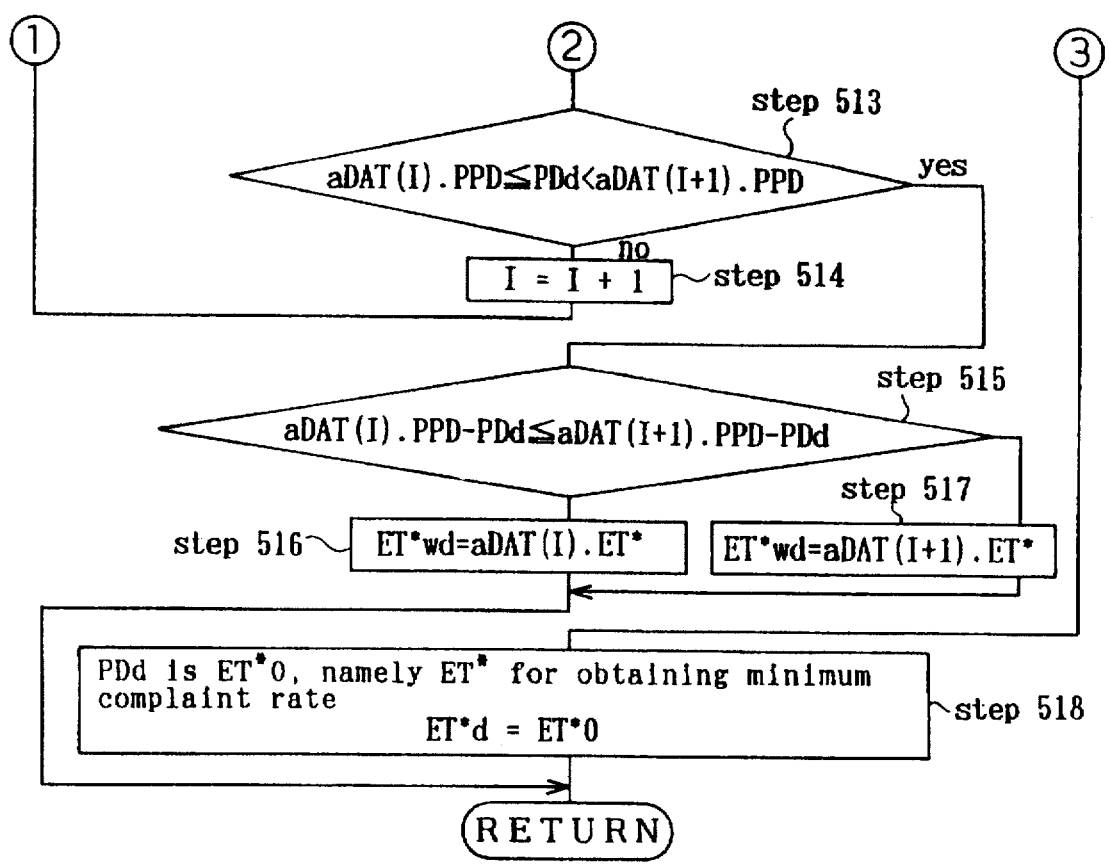

FIGS. 5(a),(b) shows a method of calculating the setting thermal condition from the setting complaint rate. In step 501, judgment is performed whether the latest complainer index of the function storage unit 223 having been input to the predicted thermal condition calculation means 23 is the same as the complainer index entered immediately before. In case they are the same, the control proceeds to step 505. In case they differ from each other, the control proceeds to step 502. In step 502, ET* is divided at intervals of 0.5° C., a unit control width. The unit control width is determined depending on the performance of the air conditioner unit and the conditions in the air-conditioned space 7. In FIG. 5, ET* is divided into 40 equal divisions in the range of 15° to 35° C. The reason for selecting the range of 15° to 35° C. is as follows: in the ranges other than the range of 15° to 35° C., the complaint rate generally reaches close to 100%, and it will become not worthwhile using air conditioning. Furthermore in step 503, warmth-caused complaint rate aPDwd (I) and cold-caused complaint rate aPDcd (I) are obtained for every equal division of ET* obtained in step 502.

[Expression 20]

$$aPDwd(i) = \frac{100}{1 + e^{aw+\beta w \cdot ax(i)}}$$

$$aPDcd(i) = \frac{100}{1 + e^{ac+\beta c \cdot ax(i)}}$$

where ax(i) is ET* for every unit control width.

In step 504, the sum of the two rates, namely aPDd(I) is obtained.

$$aPDd(i) = aPDwd(i) + aPDcd(i) \qquad \text{[Expression 21]}$$

In step 505, the counter is reset. To find out a value of aPDd(I) closest to PDd and to calculate a control condition, search is repeated until the counter counts from I=0 to I=40. In case a value of aPDd(I) closest to PDd is not found out, it is assumed that PDd has been set at the minimum complaint rate or lower. Therefore, in step 518, ET*d is replaced with ET*0, a thermal condition for obtaining the minimum complaint rate.

In case ax(I) is less than ET* for obtaining the lowest complaint rate in step 507, the control proceeds to step 508. In case ax(I) is not less than ET* for obtaining the lowest complaint rate, the control proceeds to step 513. In case ax(I) is less than ET* for obtaining the lowest complaint rate, the effect of Cold-PPD becomes significant. As ET* is larger, the cold-caused complaint rate becomes lower.

$$aPDd(i) \leq aPDd(i+1) \qquad \text{[Expression 22]}$$

In case ax(I) is not less than ET* for obtaining the lowest complaint rate, the effect of Warm-PPD becomes significant. As the ET* is larger, the warmth-caused complaint rate becomes higher.

$$aPDd(i) \geq aPDd(i+1) \qquad \text{[Expression 23]}$$

Judgment is conducted as described above in step 507. When aPDd(I) closest to PDd is aPDd(j), the lowest value of the setting ET* becomes ax(j).

$$aPDd(i+1) \leq PDd < aPDd(i) \rightarrow j=i \text{ OR } j=i+1 \qquad \text{[Expression 24]}$$

In step 509, judgment is performed to determine which of aPDd(I) and aPDd(I+1) is closer to PDd. In case aPDd(I) is closer, j=1 is selected in step 510. In case aPDd(I+1) is closer, j=I+1 is selected in step 511.

When ax(I) is not less than ET* for obtaining the lowest complaint rate, the upper limit thermal condition in the control range becomes ax(k), in case aPDd(I) closest to PDd is aPDd(k).

$$aPDd(i) \leq PDd < aPDd(i+1) \rightarrow k=i \text{ OR } k=i+1 \qquad \text{[Expression 25]}$$

In step 515, judgment is performed to determine which of aPDd(I) and aPDd(I+1) is closer to PDd. In case aPDd(I) is closer, k=1 is selected in step 516. In case aPDd(I+1) is closer, k=I+1 is selected in step 517.

Accordingly, the range of the setting thermal condition can be represented by the following equation.

$$ax(j) \leq x \leq ax(k) \qquad \text{[expression 26]}$$

where ax(j) is the lowest value of the setting ET*.

ax(k) is the highest value of the setting ET*.

x is ET*d (setting thermal condition).

This is shown in FIG. 7. ax(j) is set at ET*cd, and ax(k) is set at ET*wd. When the calculated range of the setting ET* is entered to the operation mode judgment means 32, the entered value is compared with the value of the thermal condition ET*(n) of the air-conditioned space 7, which is calculated by the indoor thermal condition calculation means 20. In case ET*(n) is lower than the lower limit of the setting range (Expression 27), heating operation is performed.

$$ET^*cd > xn \qquad \text{[Expression 27]}$$

where xn is the current ET* value of the air-conditioned space.

In case ET* (n) is higher than the lower limit of the setting range (Expression 28), cooling operation is performed.

$$ET^*wd < xn \qquad \text{[Expression 28]}$$

where xn is the current ET* value of the air-conditioned space.

$$ET^*cd \leq xn \leq ET^*wd \qquad \text{[Expression 29]}$$

where xn is the current ET* value of the air-conditioned space.

The selected operation mode is delivered to the controller 5. In accordance with the selected operation mode, that is, in the case of cooling operation, the controller 5 opens a cooling water coil 29, and in the case of heating operation, the controller 5 opens a warming water coil 18. The controller 5 controls the opening amount of the valve, and also controls the revolution speed of a fan 26. Furthermore, in case the heating operation mode is selected by the operation mode judgment means 32, the target value of the setting value is ET*cd (lowest value), and in case the cooling operation mode is selected by the operation mode judgment means 32, the target value of the setting value is ET*wd (highest value). The environment setting value calculation means 33 calculates the setting ET* on the basis of the data entered from the operation mode judgment means 32 and the predicted thermal condition calculation means 23. Other algorithms are the same as those of the embodiment of the invention shown in FIG. 1, and the explanation of them are omitted here.

In the embodiment, ET* is used as an index for evaluating a thermal space. However, another index, such as PMV, can be replaced with ET* as described before. In case thermal factors, such as radiation temperature and humidity, in the space cannot be detected sufficiently, control can be performed by incorporating the relationship between the temperature and PPD into the PPD regression line. Furthermore, although the amount of activity is entered from the initial setting input means 10 in the above-mentioned invention, it is possible to adopt a prediction means comprising an infrared sensor or the like disposed in the air-conditioned space 7.

Since the complaint votes of the inhabitants in the air-conditioned space are considered as described below, the thermal feeling of a group can be obtained accurately, whereby comfortable air-conditioning control can be attained for groups. In addition, even when the most comfortable operation cannot be attained because of energy saving, since air conditioning is performed in consideration of the complaint rate, reasonable energy-saving operation can be accomplished.

In other words, since the opinions of all members are taken impartially and the complaint votes about the thermal conditions of the air-conditioned space are taken into consideration, the thermal conditions and the index of comfortable feeling for groups can be obtained, and the following effects can be expected.

The control for modifying the conventional PMV is assumed that the control is performed so that the complaint rate becomes minimum, namely PMV=0. In case temperature is raised or lowered to save energy, there is no guide to determine the temperature value. As a result, energy-saving operation significantly impairs the comfortableness for inhabitants in many cases. In the control of the present invention wherein the complaint rate is changed in accordance with the preferences of inhabitants, it is possible to predict the complaint rate. Therefore, the present invention can perform air conditioning in accordance with the complaint rate.

The complaint rate curve can be easily changed in accordance with votes by using the logistic regression for the regression of functions. In addition, unknown variables can be increased or decreased because of the property of the logistic functions, it is possible to establish a logistic equation by using only one parameter, such as temperature or humidity, in case it is difficult to accurately calculate thermal condition evaluation indexes, such as ET*.

Figure 11:
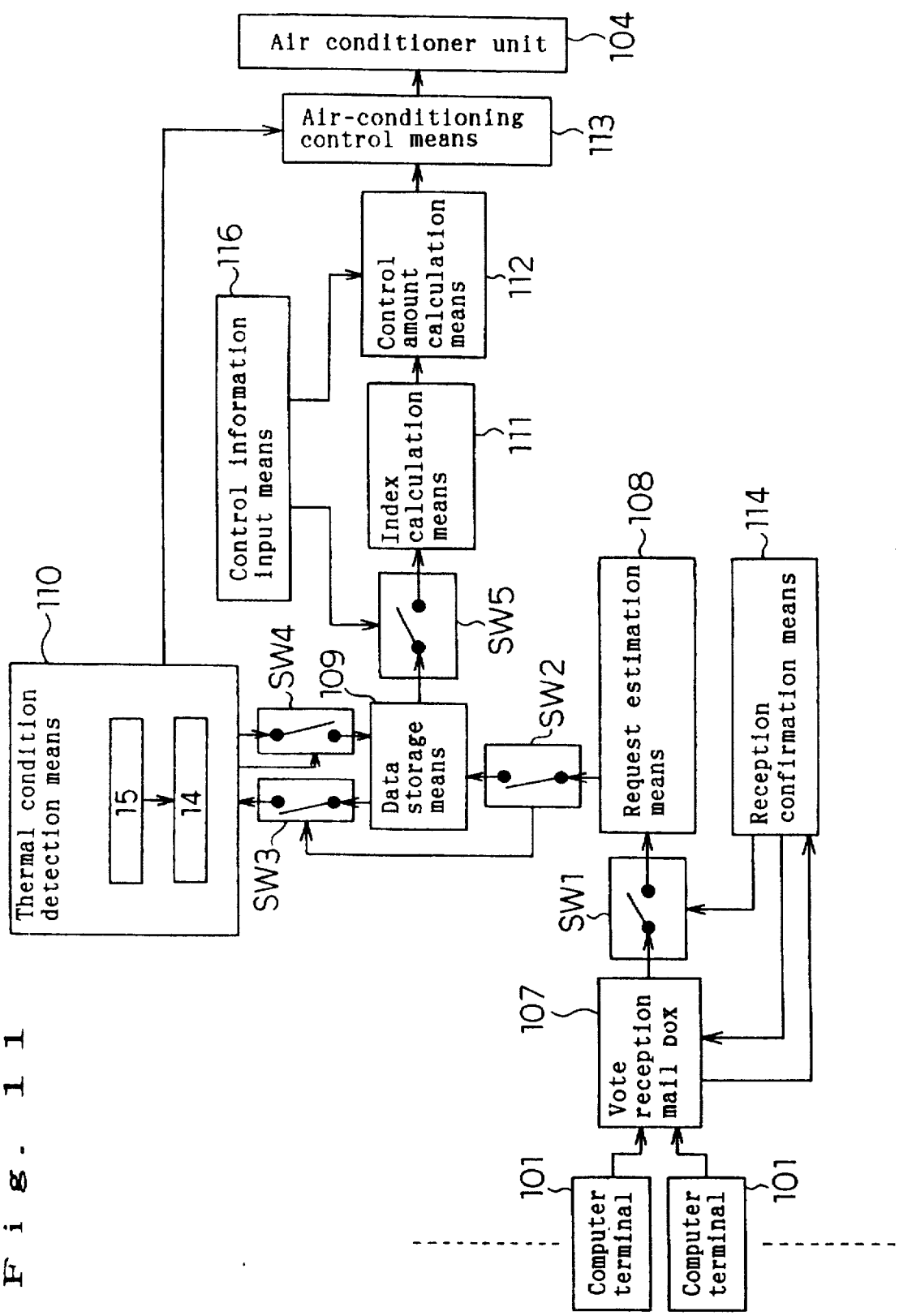
[FIG. 11]
Figure 12:
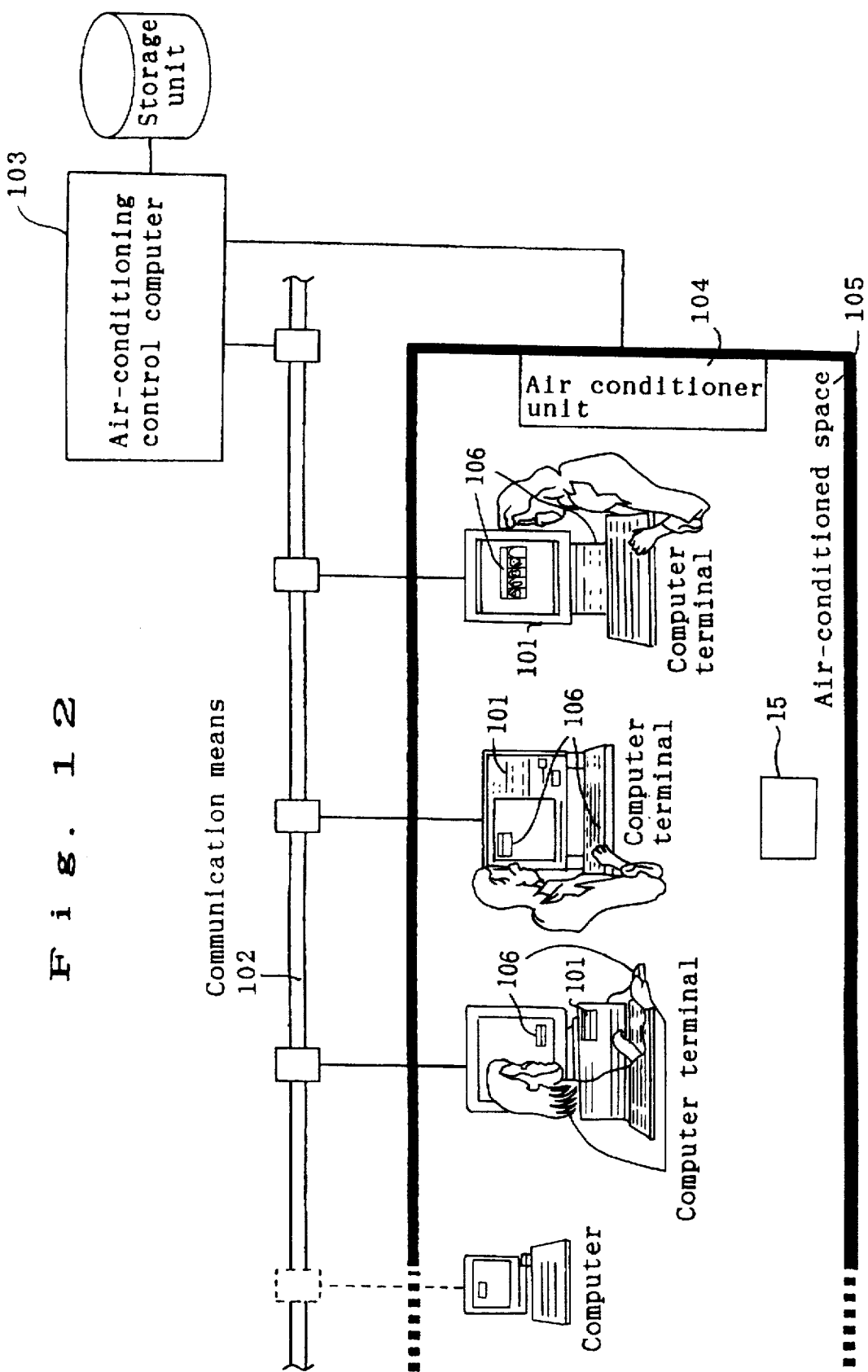
[FIG. 12]

An embodiment of the present invention is described below with reference to the drawings. FIG. 11 is a block diagram of an air-conditioning control unit in accordance with the embodiment of the present invention, and FIG. 12 is a view showing the hardware configuration of the embodiment. The air-conditioning control unit of the embodiment mainly comprises computer terminals 1, communication means 102 used as a network, and an air-conditioning control computer 103 communicable to the computer terminals 1 through the communication means 102. The computer terminal 1 is provided with vote value input means 106. A vote value entered from the vote value input means 106 is input to a vote reception mail box 107 through the communication means 102 via electronic mail or the like, and then input to the air-conditioning control computer 103. Numeral 104 represents an air conditioner unit. The air-conditioning control computer 103 mainly comprises a vote reception mail box 107, request prediction means 108, data storage means 109, thermal condition detection means 110, index calculation means 111, control amount calculation means 112 and air-conditioning control means 113. The request prediction means 108 selects and processes effective data among votes obtained by the vote reception mail box 107 so as to calculate the complaint rate indicating the request for the air-conditioned environment for the entire inhabitants. The calculated value and the thermal conditions entered from the thermal condition detection means 110 are input-to the data storage means 109. The index calculation means 111 calculates and retains the relationship between the thermal conditions and the complaint rate as a comfort index in the air-conditioned environment. On the basis of the index, the control amount calculation means 112 calculates control conditions, and the air-conditioning control means 113 controls the revolution speed of the fan of the air conditioner unit 104 and the amount of refrigerant flowing through the cooling/warming water coil so as to control the air conditioner unit 104 on the basis of the vote values.

Next, the operation of the first embodiment of the present invention is explained with reference to FIGS. 11, 13, 14 and 15. Reference codes S1, S2, ... additionally included in the explanation of the following processing operation are numbers indicating processing steps, and correspond to the codes added to the flowchart shown in FIG. 15(a),(b).

Figures 13, 14:
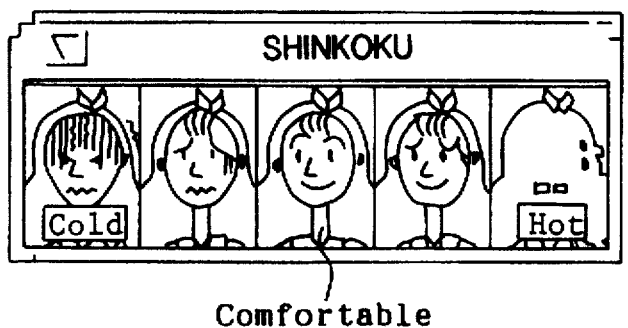
[FIG. 13]
[FIG. 14]

FIG. 13 shows an example of the vote value input means 106, namely a window used for voting on environment conditions, which is opened on the computer terminal 1. This window shows colored icons indicating the thermal feeling ranging from cold to hot so that they can be recognized at a glance. Although a five-grade voting method is used in the present embodiment, another method can also be used, provided that the method of converting the result of votes to the complainer rate is clarified. In the five-grade voting method, vote values 0, 1, 2, 3 and 4 are used from left to right in the figure. By mouse-clicking the icon corresponding to a current thermal feeling, electronic mail having a file format including vote date/time, voter's ID number (mail address in the case of the present embodiment) and vote value, as shown in FIG. 14, is automatically sent to the vote reception mail box 107. A reception confirmation means 114 monitors the vote reception mail box 107 at all times. In case mail is present, the reception confirmation means 114 delivers a signal for turning on the switch 1 so as to input a vote value to the request prediction means 108. The request prediction means 108 then starts the following processing.

The processing performed by the request prediction means 108 is explained below with reference to the flowchart of FIG. 15(a),(b). The thermal feeling about the setting temperature of the air-conditioned space greatly differs from person to person particularly during one to two hours after commuting to work in a day depending on the form of commuting, outside air temperature and the like. It is thus difficult to judge whether the votes are based on true warmth-caused complaints or true cold-caused complaints about the setting of the air-conditioned space. The same thing can be said during one hour after the lunch break. Therefore, the processing shown in FIG. 15(a),(b) is performed by the request predicting means 108. Instead of the following processing of the present embodiment, other processing can be used. For example, by providing learning means, time zones wherein the reliability of the votes is low because of high dispersion are learned in every air-conditioned space so as to selectively use data.

Figure 15A:
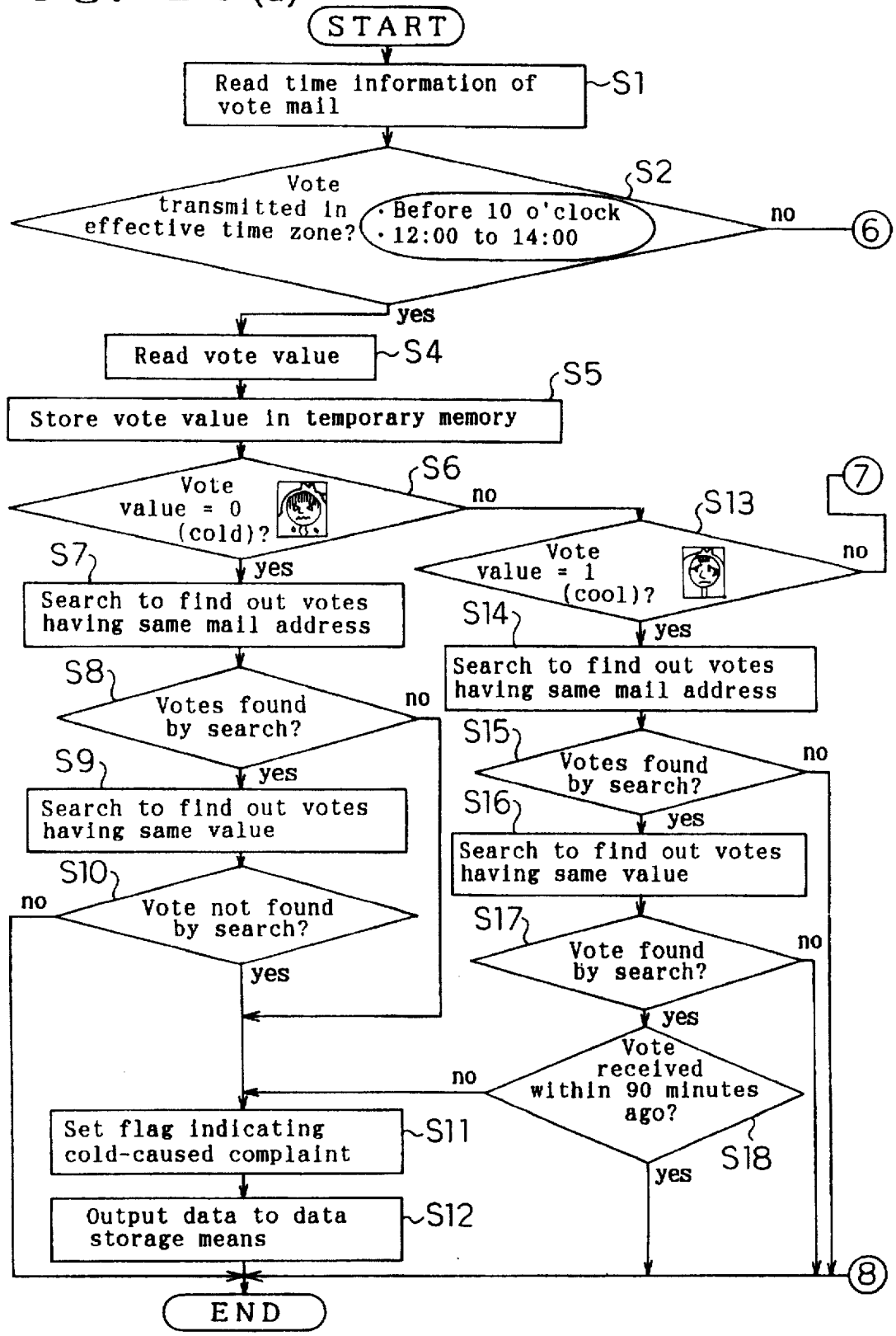
[FIGS. 15(a),(b)]
Figure 15B:
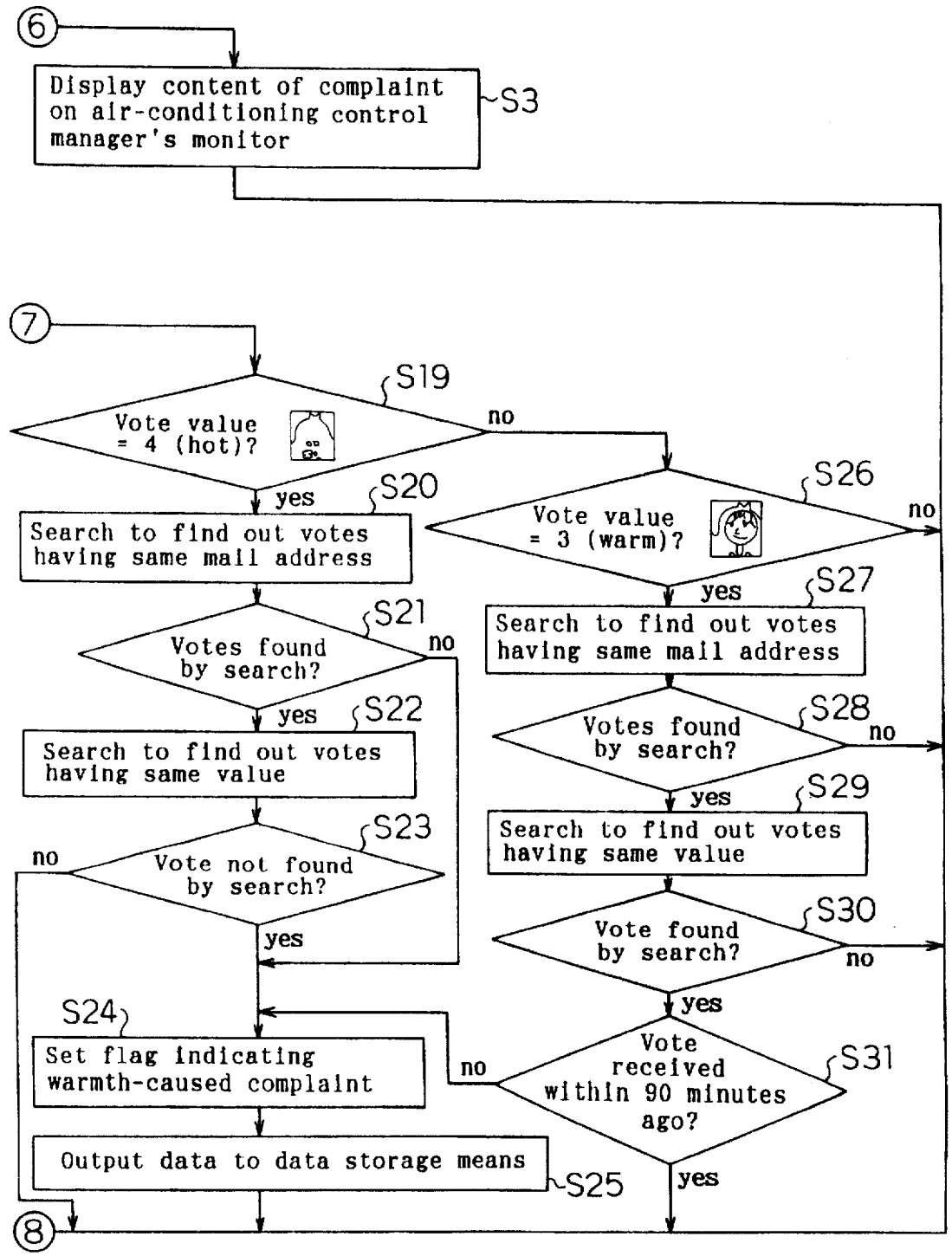

In case mail is present in the vote reception mail box 107, the flow of control shown in FIG. 15(a),(b) starts. The time information of the received mail is read (S1). In case office hours begins around 9 o'clock in the morning and the lunch break is in the range of noon to 1 o'clock in the afternoon, for example, votes received before 10 o'clock in the morning or during noon to 1 o'clock in the afternoon are low in reliability as described above. In case a vote is transmitted by an inhabitant at one of the above-mentioned time zones (S2), the information is sent only to indicate the content of a complaint on the monitor of the manager in charge of air-conditioning control (S3), but not fed back to the control. In case a vote is exercised at a time other than the time zones (S2), the vote information of the received mail is read (S4), and stored in temporary memory (S5). The information stored in the temporary memory is retained while air conditioning is performed in accordance with the same setting. However, in case the setting is changed, the information is cleared.

In case the vote value of the received mail is 0 (S6), search is performed in the temporary memory to find out votes having the same mail address as that of the received mail (S7). In case there are votes (pieces of mail) having the same mail address as that of the received mail (S8), the votes found out as a result of the search are also searched to find out votes having vote value 0 (S9). In case no mail having vote value 0 has been transmitted after the current air-conditioning setting was selected (S10), a flag indicating a cold-caused complaint is set (S11). The setting of the flag, voter's ID number (mail address in this case), and date/time are then delivered to the data storage means 109 (S12). This processing stores data indicating the feeling of each inhabitant about the current air-conditioning setting in the data storage means 109, thereby preventing double recording.

In case the vote value of the received mail is 1 (S13), search is performed in the temporary memory to find out votes having the same mail address as that of the received mail (S14). In case there are votes having the same mail address (mail by the same person) (S15), the votes found out as a result of the search are also searched to find out votes having vote value 1 (S16). This processing is necessary because of the following reason. In case there is no mail transmitted by the same person, that is, in case the received vote is transmitted for the first time about the current air-conditioning setting, it is impossible to judge whether the vote results from the variation in each person or not. Accordingly, this processing is used to prevent the first vote from being fed back to the control. In case pieces of mail sent by the same person have different vote values, particularly in case the mail includes votes having vote value 3 which is opposite to vote value 1 with respect to neutral value 2, these votes are regarded to result from the variation in each person, and prevented from being fed back to the control. In case there is a vote having vote value 1 as the result of the search (S17), the control proceeds to S18, and in case the vote was received more than 90 minutes ago (S18), the control proceeds to S1.

In case vote value is 4 (S19), search is performed in the temporary memory to find out votes having the same address as that of the received mail (S20). In case there are votes having the same mail address (mail by the same person) (S121), the votes found out as a result of the search are also searched to find out votes having vote value 4 (S22). In case no mail having vote value 4 has been transmitted after the current air-conditioning setting was selected (S23), a flag indicating a warmth-caused complaint is set (S24). The setting of the flag, voter's ID number (mail address in this case), and date/time are then delivered to the data storage means 109 (S25). This processing stores data indicating the feeling of each inhabitant about the current air-conditioning setting in the data storage means 109, thereby preventing double recording.

In case the vote value is 3 (S26), search is performed in the temporary memory to find out votes having the same mail address as that of the latest mail (S27). In case there are votes having the same mail address (S28), the votes found out as a result of the search are also searched to find out votes having vote value 3 (S29). In case there is a vote having vote value 3 as the result of the search (S30), the transmission data/time of the vote is read and the control proceeds to S31, and in case the vote was received earlier than the latest mail more than 90 minutes ago (S31), the control proceeds to S25.

In steps S12 and S25, the switch SW2 is turned on, and a signal for turning on the switch SW3 is delivered at the same time. The switches are automatically turned off after information has passed. The explanation of the OFF operation is omitted in the following descriptions. When the switch SW2 is turned on, vote information including the flag indicating a warmth-caused complaint or the flag indicating a cold-caused complaint is input to the data storage means 109. When the switch SW3 is turned on, the date/time information of the mail is delivered to the thermal condition detection means 110. The thermal condition detection means 110 comprises a thermal condition storage means 14 and a thermal sensor 15. The information obtained every moment by the thermal sensor 15 disposed in an air-conditioned space 105 is stored together with the date/time information into the thermal condition storage means 14. The thermal condition detection means 110 selects the thermal condition at the date/time corresponding to the date/time entered via the switch SW3. When the selection is performed, a signal for turning on the switch SW4 is delivered. As a result, the selected thermal condition information is delivered to the data storage means 109 via the switch SW4.

FIG. 16 shows the format of the storage information stored in the data storage means 109. The request prediction means 108 predicts whether vote values received discretely on the time axis are effective data or not so as to accurately grasp each person's complaint about the current air-conditioning condition. The data is then stored in the data storage means 109, thereby preventing incorrect calculation of comfort indexes.

The index calculation means 111 reads the information stored in the data storage means 109 on the basis of the signal from control-information input means 116. The control information input means 116 is used to input information on control by the manager of a building or the user who controls the entire air conditioning. The control information input means 116 can be used to set changes in control conditions and to input thermal condition setting values for grasping complaints about air conditioning and for controlling operation. In case a signal for changing the setting conditions of the air conditioner unit 104 each time a complaint is brought is input from the control information input means 116, the switch SW5 is in the ON state at all times. Therefore, each time new vote information including a flag indicating a cold-caused complaint or a flag indicating a warmth-caused complaint and thermal condition information are input to the data storage means 109, the information stored in the data storage means 109 is read from the data storage means 109 to the index calculation means 111.

In case a signal for performing check for change on a daily basis, the information stored up to the preceding day is read from the data storage means 109 to the index calculation means 111 at the start of the day.

In case a signal for performing check for change on a weekly basis, the information stored up to the preceding week is read from the data storage means 109 to the index calculation means 111 at the start of the week.

The index calculation means 111 calculates the relationship between the complaint rate, namely the rate of inhabitants complaining about the thermal conditions in the air-conditioned space 105 and calculated by the request prediction means 108, and the thermal conditions detected by the thermal condition detection means 110. The thermal conditions are obtained from the thermal sensor 15. In addition to the detected humidity, airflow velocity, radiation temperature, the amount of activity or the amount of clothing depending on the type of the thermal sensor 15, thermal indexes, such as PMV and ET*, can also be used as thermal conditions, provided that they can be predicted or entered.

Figure 17:
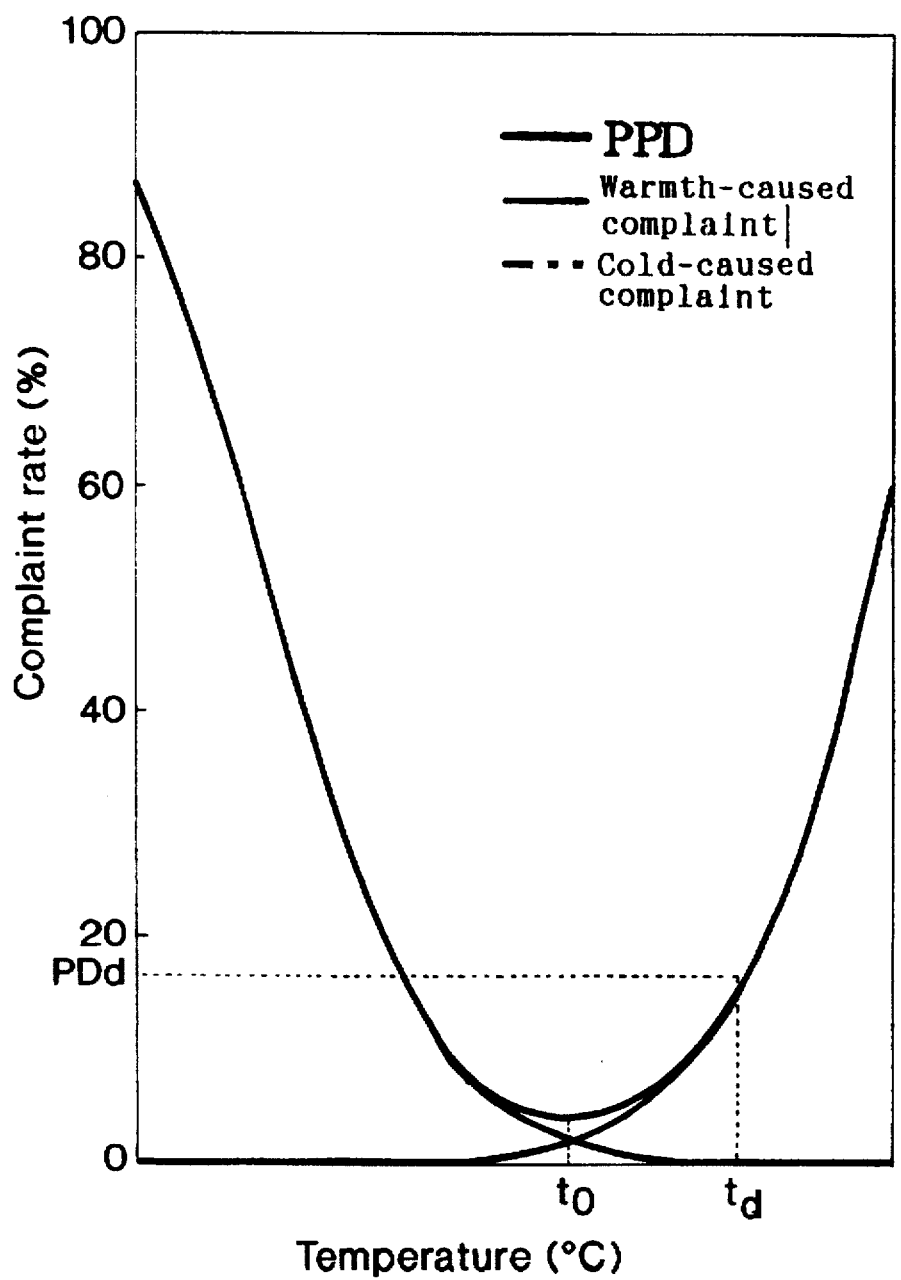
[FIG. 17]
Figure 18:
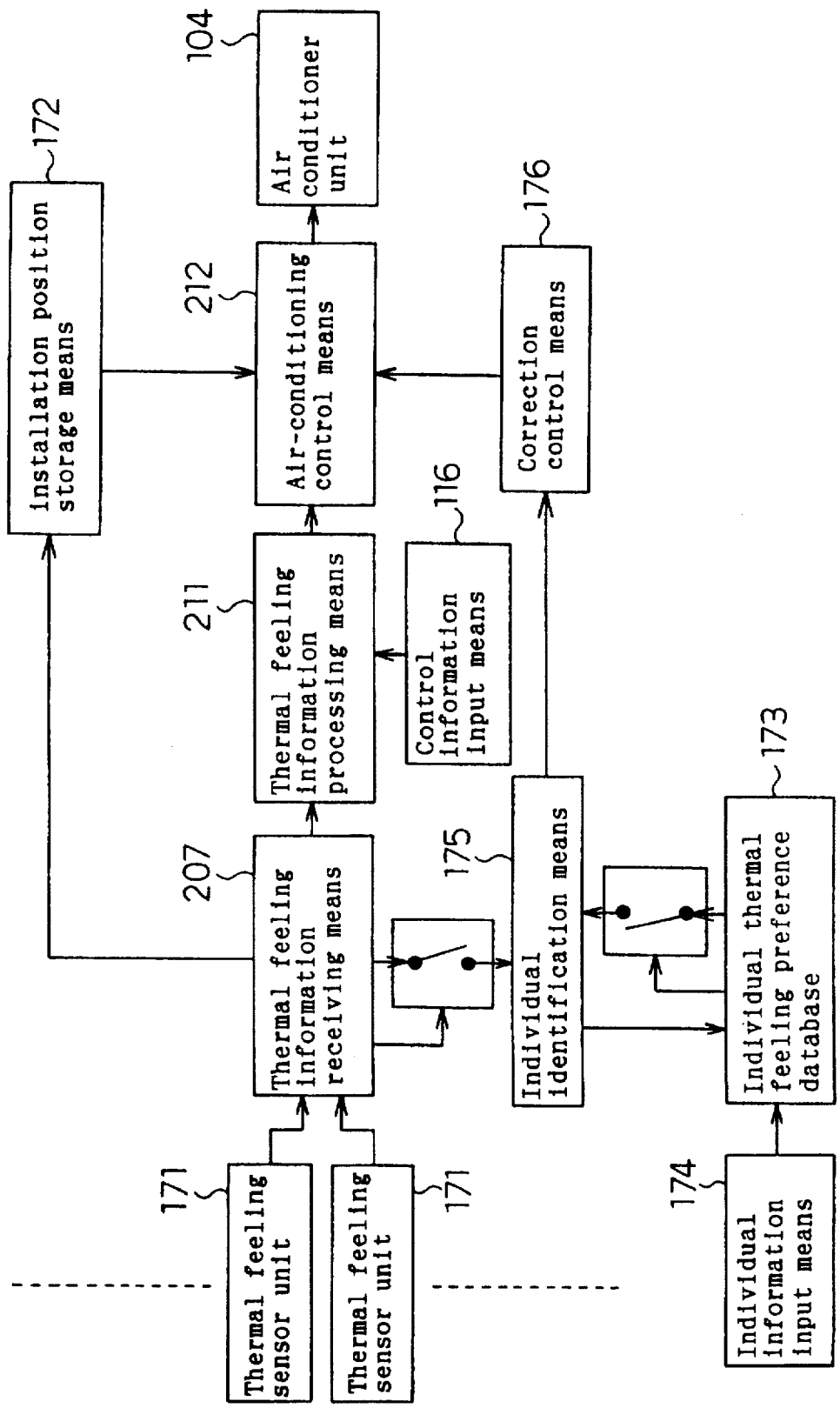
[FIG. 18]
Figure 19:
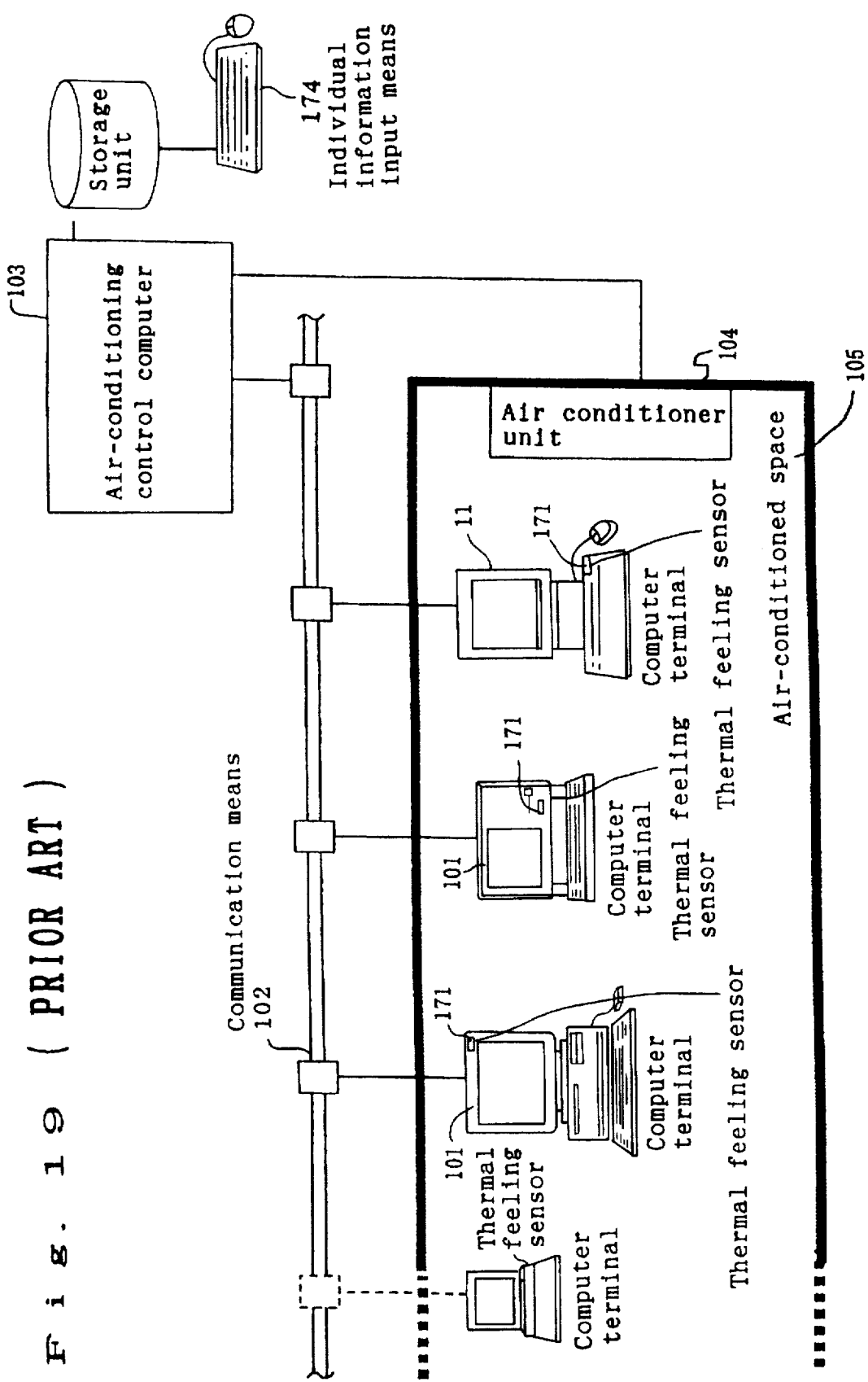
[FIG. 19]

In the present embodiment, it is assumed that the thermal sensor 15 is a room temperature sensor, and that the index calculation means 111 calculates an index indicating the relationship between the room temperature and the rate of complaint about setting. The complaint rates have been disclosed as values statistically calculated with respect to PMV by using an approximate expression in the ISO 7730 standard. In this case, the complaint rates are obtained when PMV values −2, −3, +2 and +3 are assumed as the grades of complaints, and do not reflect the thermal preferences or the like of the inhabitants. To solve this problem, the present embodiment uses the PMV values and the complaint rates specified in ISO 7730 as default values. The indexes of the default complaint rates cited from "Thermal Comfort" on which the complaint rates are based are shown in FIG. 17 so that the complaint rates specified in ISO 7730 can be converted to cold-caused complaint values and warmth-caused complaint values. When new data is input, an expression representing both the data and the previous data most appropriately is approximated and stored as a comfort index. The index calculation means 111 summarizes and statistically processes the complaints about thermal conditions for each person, which have been stored in the data storage means 109, so as to calculate a comfort index.

On the basis of the comfort index calculated by the index calculation means 111, the control amount calculation means 112 calculates a temperature value at which the number of inhabitants complaining the air conditioning in the air-conditioned space 105 becomes minimum. That is to day, the temperature value is t0 shown in FIG. 17. Alternatively, on the basis of the comfort index, the control amount calculation means 112 calculates a temperature value corresponding to an allowable complaint rate entered and set via the control information input means 116 by the manager in charge of air-conditioning control. That is to day, the temperature value is td obtained when the complaint rate entered from the control information input means 116 is PDd shown in FIG. 17. The setting temperature calculated by the control amount calculation means 112 is delivered to the air-conditioning control means 113.

While the detection results of the thermal conditions in the air-conditioned space 105 are entered from the thermal sensor 15, the air-conditioning control means 113 adjusts the revolution speed of the fan and the opening/closing amounts of the valves of the cooling/heating water coils in the air conditioner unit 104 so as to keep the thermal conditions of the air-conditioned space 105 at the setting values, thereby controlling the air conditioner unit.

Although electronic mail is used by the communication means 102 in the above-mentioned embodiment, it is possible to use LAN, groupware, WWW browser or the like for development.

In case WWW or the like is used, two-way communication is possible. Therefore, when a user, namely an inhabitant, exercises a vote on a request for his air-conditioning environment, the user can know how the vote is reflected on the air-conditioning conditions. In case the vote is not reflected, the user can know why the vote is not reflected. Consequently, this air-conditioning control method can offer a high level of satisfaction to the inhabitants physically and mentally.

As obviously stated in the above descriptions, the present invention can directly and easily receives votes on complaints about the thermal conditions in air-conditioned spaces from all inhabitants by using communication lines. Consequently, the present invention can perform optimal air-conditioning control by using existing sensors, and can also perform efficient air-conditioning control by individually controlling air-conditioned spaces.

Furthermore, the present invention provides media, such as floppy disks, optical discs and the like, having stored programs for implementing all or part of the operation functions of the means of the above-mentioned air-conditioning control unit.

We claim:

1. An air-conditioning control unit comprising:

vote value input means used for an inhabitant to exercise a vote on thermal feeling, such as hot or cold, complaint rate calculation means for calculating complaint rates of inhabitants who complain about thermal feeling, with such-categories of warmth-caused complaints and cold-caused complaints, in consideration of a plurality of vote values obtained from said vote value input means, indoor thermal condition calculation means for calculating thermal environment evaluation indexes on the basis of thermal conditions, such as room temperature and humidity, in an air-conditioned space, a data storage unit for storing the complaint rates delivered from said complaint rate calculation means and thermal conditions calculated by said indoor thermal condition calculation means, updating means for renewing a function representing a relationship between complaint rates and thermal conditions in accordance with the complaint rates and thermal conditions stored in said data storage unit when new data is stored in said data storage unit, control information input means for inputting control information, namely a complaint rate used as a control target, predicted thermal condition calculation means for calculating the thermal conditions in an air-conditioned space on the basis of the function calculated by said updating means and the control information entered from said control information input means, and a controller for controlling air conditioning so as to attain thermal conditions delivered from said predicted thermal condition calculation means.

2. An air-conditioning control unit according to claim 1, comprising:

operation mode judgment means for judging whether an air conditioner unit is cooling operation, heating operation or air circulation operation on the basis of the thermal conditions calculated by said predicted thermal condition calculation means and the thermal conditions of the air-conditioned space calculated by said indoor thermal condition calculation means, and environment setting value calculation means for calculating environment setting conditions from the thermal conditions calculated by said predicted thermal condition calculation means on the basis of the operation mode judged by said operation mode judgment means, wherein said controller performs air-conditioning control on the basis of the environment setting values delivered from said operation mode judgment means and said environment setting value calculation means.

3. An air-conditioning control unit according to claim 1 or 2, being characterized in that:

said updating means comprises an updating judgment unit, a regression unit and a function storage unit for storing the function, said updating judgment unit judges whether it is necessary to renew the function stored in said function storage unit when a new complaint rate and thermal condition are input to said data storage unit, said data storage unit delivers storage data to said regression unit only when said updating judgment unit judges that it is necessary to renew the function, and said regression unit performs regression by using a logistic function having an upper limit of 100% on the basis of the storage data so as to renew the function of said function storage unit.

4. An air-conditioning control unit according to claim 1 or 2, being characterized in that:

said updating means comprises an updating judgment unit, a regression unit, a function storage unit for storing the function, an initial value storage unit for storing initial data and a default function storage unit for storing a default function, said updating judgment unit judges whether it is necessary to renew the function stored in said function storage unit when a new complaint rate and thermal condition are input to said data storage unit, said data storage unit delivers storage data to said regression unit only when said updating judgment unit judges that it is necessary to renew the function, said default function storage unit stores an approximate function based on the thermal conditions specified in ISO 7730 and complaint rate data, and said initial value storage unit calculates initial data of thermal conditions and complaint rate from the function stored in said default function storage unit when no data is stored in said data storage unit or the data stored in said data storage unit is reset so that the obtained data can be used for the calculation by said regression unit.

5. An air-conditioning control unit according to claim 3, wherein said updating means comprises function change means for transmitting a command for changing the function stored in said regression unit to said regression unit in accordance with detected or predictable information on the thermal conditions in said air-conditioned space.

6. An air-conditioning control unit comprising input means used by inhabitants to exercise their votes on requests for their air-conditioned environment, communication means for transmitting signals entered from said input means, request estimation means for estimating requests for the air-conditioned environment of all the inhabitants on the basis of the signals transmitted by said communication means, index calculation means for calculating the index indicating the relationship between the request calculated by said request estimation means and the thermal conditions in the air-conditioned environment, control amount calculation means for calculating the amount of control in the air-conditioned environment on the basis of the index calculated by said index calculation means, and air-conditioning control means for controlling an air conditioner unit in accordance with the amount of control calculated by said control amount calculation means.

7. An air-conditioning control unit according to claim 6, wherein said request estimation means estimates a request for the air-conditioned environment of all inhabitants in consideration of a time zone when a vote on a request for the air-conditioned environment is exercised by an inhabitant.

8. Media having stored programs for implementing the operation functions of said means of an air-conditioning control unit according to any one of claims 1, 2, 6 or 7.

* * * * *